US011606418B2

(12) United States Patent
Bharti et al.

(10) Patent No.: US 11,606,418 B2
(45) Date of Patent: Mar. 14, 2023

(54) APPARATUS AND METHOD FOR ESTABLISHING CONNECTION AND CLAT AWARE AFFINITY (CAA)-BASED SCHEDULING IN MULTI-CORE PROCESSOR

(71) Applicant: Samsung Electronics Co., Ltd., Suwon-si (KR)

(72) Inventors: Chhaya Bharti, Bangalore (IN); Madhan Raj Kanagarathinam, Bangalore (IN); Rohit Shankar Lingappa, Bangalore (IN); Gyanchandani Monty, Bangalore (IN); Jaekwang Han, Suwon-si (KR); Karthikeyan A, Bangalore (IN); Milim Lee, Suwon-si (KR); Sandesh Kumar Srivastava, Bangalore (IN); Wangkeun Oh, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 104 days.

(21) Appl. No.: 17/250,554

(22) PCT Filed: Aug. 2, 2019

(86) PCT No.: PCT/KR2019/009688
§ 371 (c)(1),
(2) Date: Feb. 2, 2021

(87) PCT Pub. No.: WO2020/027631
PCT Pub. Date: Feb. 6, 2020

(65) Prior Publication Data
US 2021/0176302 A1 Jun. 10, 2021

(30) Foreign Application Priority Data

Aug. 3, 2018 (IN) .............................. 201841029324
Jul. 31, 2019 (IN) .............................. 201841029324

(51) Int. Cl.
*G06F 15/173* (2006.01)
*H04L 67/1008* (2022.01)
(Continued)

(52) U.S. Cl.
CPC ........ *H04L 67/1008* (2013.01); *G06F 9/4881* (2013.01); *H04L 69/22* (2013.01)

(58) Field of Classification Search
None
See application file for complete search history.

(56) References Cited

U.S. PATENT DOCUMENTS

2007/0258399 A1 11/2007 Chen
2011/0019669 A1* 1/2011 Ma ........................ H04L 45/302
370/389
2014/0258496 A1 9/2014 Wu et al.

FOREIGN PATENT DOCUMENTS

CN 102904976 A 1/2013
CN 102984300 A 3/2013
WO 2017021081 A1 2/2017

OTHER PUBLICATIONS

International Search Report and Written Opinion of the International Searching Authority in connection with International Application No. PCT/KR2019/009688 dated Nov. 29, 2019, 9 pages.

(Continued)

*Primary Examiner* — Wing F Chan
*Assistant Examiner* — Andrew Woo

(57) ABSTRACT

Embodiments herein provide a method for CLAT Aware Affinity (CAA)-based scheduling by a user equipment (UE) (100) comprising a multi-core processor (120). The method includes a CAA scheduler (180) at the user equipment (100) receiving a packet and determining a path characteristic of the packet. Further, the method includes the CAA scheduler (180) determining, at least one of a IPv4 connection and a IPv6 connection based the path characteristic of the packet;

(Continued)

and establishing a connection to at least one of an IPv4 server and an IPv6 server based on the determined at least one of the IPv4 connection and the IPv6 connection. Further, the method includes the CAA scheduler (180) classifying the packet into at least one class and scheduling the packet on at least one core of the multi-core processor (120) based on the at least one class.

12 Claims, 28 Drawing Sheets

(51) Int. Cl.
*G06F 9/48* (2006.01)
*H04L 69/22* (2022.01)

(56) References Cited

OTHER PUBLICATIONS

Examination report under sections 12 & 13 of the Patents Act, dated Apr. 12, 2021, in connection with Indian Patent Application No. 201841029324, 5 pages.

* cited by examiner

APPARATUS AND METHOD FOR ESTABLISHING CONNECTION AND CLAT AWARE AFFINITY (CAA)-BASED SCHEDULING IN MULTI-CORE PROCESSOR

CROSS-REFERENCE TO RELATED APPLICATIONS

This application is a 371 National Stage of International Application No. PCT/KR2019/009688, filed Aug. 2, 2019, which claims priority to Indian Patent Application No. 201841029324, filed Aug. 3, 2018, and Indian Patent Application No. 201841029324, filed Jul. 31, 2019, the disclosures of which are herein incorporated by reference in their entirety.

BACKGROUND

1. Field

The embodiments herein relate to device management, and more particularly, to a method and user equipment (UE) for establishing connection and CLAT Aware Affinity (CAA)-based scheduling in a multi-core processor. The present application is based on, and claims priority from an Indian Application Number 201841029324 filed on 3 Aug. 2018, the disclosure of which is hereby incorporated by reference herein.

2. Description of Related Art

In general, a great demand for data and speed is the main focus of mobile operators especially with the advent of next generation mobile networks. IPv6 deployment is increasing around the world with over 9 million domain names and 23% of all networks advertising IPv6 connectivity. However, the transition from IPv4 to IPv6 is gradual. Currently, there are numerous techniques which facilitate transition of the IPv6 to the IPv4, which facilitate the co-existence of both the IPv4 and the IPv6 entities such as dual stack, tunneling and address translation.

However, one of the major issues faced in case of the co-existence of both the IPv4 and the IPv6 in CLAT (Customer side translator) is a double processing of data packets, as shown in FIG. 1. The IPv4 data are sent to the CLAT running in the UE 100 which translates the address of the data packets into synthesized IPv6 from the IPv4 and sends the synthesized IPv6 addressed data packet to a PLAT (Platform side translator) server in the network using a mobile interface (e.g., RMNET). Referring to the FIG. 1, the data is processed double the times than a direct IPv4 connection or a direct IPv6 connection. Hence the conventional mechanisms impact the throughput of the UE 100 due to multi level data processing, a double address translation and a CPU/system unaware scheduling.

The above information is presented as background information only to help the reader to understand the present invention. Applicants have made no determination and make no assertion as to whether any of the above might be applicable as prior art with regard to the present application.

SUMMARY

The principal object of the embodiments herein is to provide a method for establishing a connection and CLAT Aware Affinity (CAA)-based scheduling in a multi-core processor.

Another object of the embodiments herein is to determine a path characteristic of the packet and establish a connection to at least one of an IPv4 server and an IPv6 server.

Another object of the embodiments herein is to classify a packet into at least one class of a class A, a class B and a class C based on an IP header of the packet.

Another object of the embodiments herein is to determine whether the packet is classified into one of the Class A, the Class B and the Class C; and create one of a high priority queue, an intermediate priority queue and a low priority queue and schedule the packet.

Another object of the embodiments herein is to schedule the packet on at least one core of the multi-core processor based on the at least one class.

Accordingly, the embodiments herein provide a method for CLAT Aware Affinity (CAA)-based scheduling by a user equipment (UE) (100) comprising a multi-core processor (120). The method includes a CAA scheduler (180) at the user equipment (100) receiving a packet and determining a path characteristic of the packet. Further, the method includes the CAA scheduler (180) determining, at least one of a IPv4 connection and a IPv6 connection based the path characteristic of the packet; and establishing a connection to at least one of an IPv4 server and an IPv6 server based on the determined at least one of the IPv4 connection and the IPv6 connection. Further, the method includes the CAA scheduler (180) classifying the packet into at least one class and scheduling the packet on at least one core of the multi-core processor (120) based on the at least one class.

Accordingly, the embodiments herein provide user equipment for CLAT Aware Affinity (CAA)-based scheduling. The UE includes a memory, a multi-core processor and a CAA scheduler, coupled to the multi-core processor and the memory. The CAA scheduler is configured to receive a packet and determine a path characteristic of the packet. Further, the CAA scheduler (180) is configured to determine at least one of a IPv4 connection and a IPv6 connection based the path characteristic of the packet and establish a connection to at least one of an IPv4 server and an IPv6 server based on the determined at least one of the IPv4 connection and the IPv6 connection. Further, the CAA scheduler (180) is configured to classify the packet into at least one class and scheduling the packet on at least one core of the multi-core processor (120) based on the at least one class.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

Various embodiments of the present disclosure provide establishing connection and CLAT Aware Affinity that is more effective.

BRIEF DESCRIPTION OF THE DRAWINGS

This invention is illustrated in the accompanying drawings, throughout which like reference letters indicate corresponding parts in the various figures. The embodiments herein will be better understood from the following description with reference to the drawings, in which.

DETAILED DESCRIPTION

Figure 1:
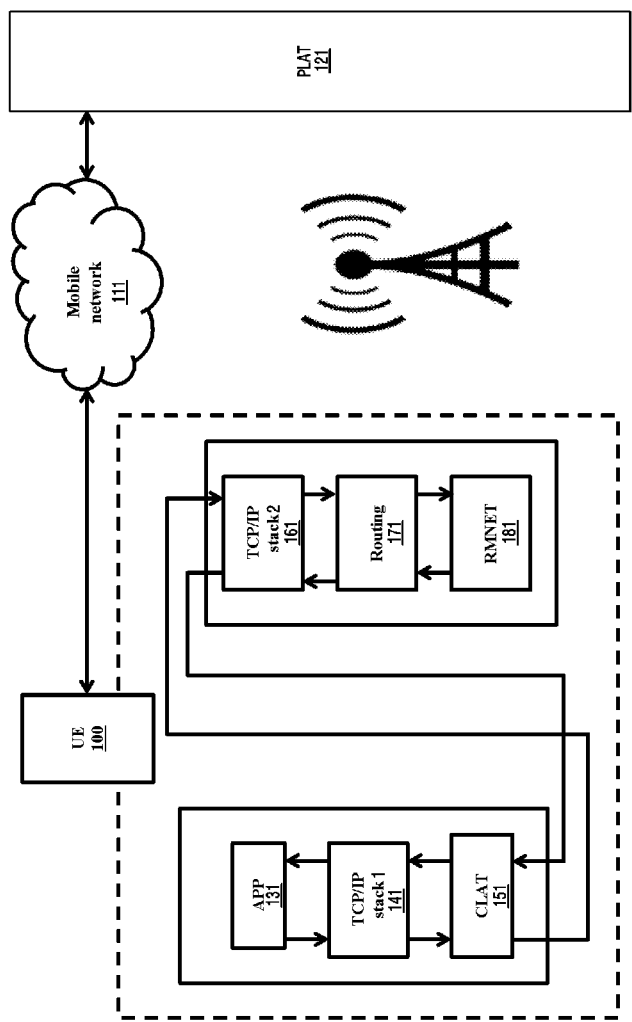
FIG. 1 is system diagram illustrating multilevel data processing in a CLAT (Customer side translator) of a user equipment (UE), according to a prior art.

Various embodiments of the present disclosure will now be described in detail with reference to the accompanying drawings. In the following description, specific details such as detailed configuration and components are merely provided to assist the overall understanding of these embodiments of the present disclosure. Therefore, it should be apparent to those skilled in the art that various changes and modifications of the embodiments described herein can be made without departing from the scope and spirit of the present disclosure. In addition, descriptions of well-known functions and constructions are omitted for clarity and conciseness.

Also, the various embodiments described herein are not necessarily mutually exclusive, as some embodiments can be combined with one or more other embodiments to form new embodiments.

Herein, the term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments may be described and illustrated in terms of blocks which carry out a described function or functions. These blocks, which may be referred to herein as units, engines, manager, modules or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and/or software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

Accordingly, the embodiments herein provide a method for CLAT Aware Affinity (CAA)-based scheduling by a user equipment (UE) (100) comprising a multi-core processor (120). The method includes a CAA scheduler (180) at the user equipment (100) receiving a packet and determining a path characteristic of the packet. Further, the method includes the CAA scheduler (180) determining, at least one of a IPv4 connection and a IPv6 connection based the path characteristic of the packet; and establishing a connection to at least one of an IPv4 server and an IPv6 server based on the determined at least one of the IPv4 connection and the IPv6 connection. Further, the method includes the CAA scheduler (180) classifying the packet into at least one class and scheduling the packet on at least one core of the multi-core processor (120) based on the at least one class.

In an embodiment, classifying, by the CAA scheduler, the packet into at least one class includes determining whether a IP header of the packet comprises one of a IPv4 prefix IP address and a IPV6 prefix and classifying the packet into one of a Class A network in response to determining that the IP header of the packet comprises IPV4 prefix, a Class B network in response to determining that the IP header of the packet comprises IPV6 prefix, and a Class C network in response to determining that the IP header of the packet neither comprises IPv4 prefix nor IPV6 prefix.

In an embodiment, the Class A network indicates forwarded packet or local packet between the CLAT and APPs having an IPv4 header.

In an embodiment, the Class B network indicates actual or live air packets between RMNET and PLAT with a synthesized IPv6 header.

In an embodiment, the Class C network indicates packets with direct IPv6 header or local socket communication inside the user equipment.

In an embodiment, scheduling, by the CAA scheduler, the packet on at least one core of the multi-core processor based on the at least one class includes determining whether the packet is classified into one of the Class A network, the Class B network and the Class C network. Further, the method includes creating one of a high priority queue and marking the packet in the high priority queue in response to determining that the packet is classified into the Class A network, an intermediate priority queue and marking the packet in the intermediate priority queue in response to determining that the packet is classified into the Class B network, a low priority queue and marking the packet in the low priority queue in response to determining that the packet is classified into the Class C network. Further, the method also includes scheduling, by the CAA scheduler, the packet on at least one core of the multi-core processor from one of the high priority queue, the intermediate priority queue, and the low priority queue.

In an embodiment, scheduling, by the CAA scheduler, the packet on at least one core of the multi-core processor based on one of the high priority queue, the intermediate priority queue, and the low priority queue includes monitoring operational conditions of the multi-core processor. Further, the method includes modifying a CPU affinity of the multi-core processor based on the operational conditions and one of the high priority queue, the intermediate priority queue, and the low priority queue and scheduling the packet on at least one core of the multi-core processor based on the modification.

In an embodiment, the operational conditions comprises at least one of a CPU load, a CPU Frequency, a current CPU affinity, a Receive Packet Steering (RPS), and CAA cross layer parameters.

In an embodiment, the CAA cross layer parameters comprises at least one of radio information of the user equipment, battery information of the user equipment, display information of the user equipment, Radio Interface Layer Daemon (RILD) information, and Network Daemon (NETD) information.

In an embodiment, scheduling, by the CAA scheduler, the packet on at least one core of the multi-core processor based on one of the high priority queue, the intermediate priority queue, and the low priority queue includes modifying a CPU affinity of the multi-core processor based on one of the high priority queue, the intermediate priority queue, and the low priority queue and scheduling the packet on at least one core of the multi-core processor based on the modification.

In an embodiment, the method further comprises determining, by the CAA scheduler, a path characteristic of the packet and determining, by the CAA scheduler, at least one of an IPv4 connection and an IPv6 connection based the path characteristic of the packet. Further, the method also includes establishing, by the CAA scheduler, a connection to at least one of an IPv4 server and an IPv6 server based on the determined at least one of the IPv4 connection and the IPv6 connection.

In an embodiment, the establishing, by the CAA scheduler, the connection to at least one of the IPv4 server and the IPv6 server includes performing, by the CAA scheduler, one of connecting to the IPv4 server in response to determining that an IPv6 server is absent, connecting to the IPv6 server only in response to determining that a performance of the IPv6 server and a performance of the IPv4 server are equal, and connecting to the IPv4 server in response to determining that the performance of the IPv4 server is better than the performance of the IPv6 server.

In the conventional methods and systems, the power consumption by the UE increases due to due to CPU unaware scheduling. Unlike to the conventional methods and systems, in the proposed method the CAA scheduler estimates the real-time CPU load and classifies the packets dynamically, thereby reducing the power consumption and increasing the throughput.

The conventional methods and systems deploy the IPv6 to LTE networks. In the IPv6 LTE network, only the IPv6 addresses are assigned to network interfaces (such as for example, RMNET in Android) on the UE. However, the interface which has the IPv4 address is still needs to send and receive the IPv4 packets since some applications use the IPv4.

The conventional 464XLAT is a simple and scalable double address translation technique which includes two architectures, one is CLAT (Customer side translator) and the other is a PLAT (Platform side translator). CLAT generally resides on the end user mobile device. It is a stateless translation which proffers 1:1 mapping and translates IP address in an algorithmic way whereas PLAT is a stateful translator which maintains a mapping database and offers 1:N mapping.

Referring now to the drawings, and more particularly to FIGS. 1 through 17B, where similar reference characters denote corresponding features consistently throughout the figures, there are shown preferred embodiments.

Figure 2A:
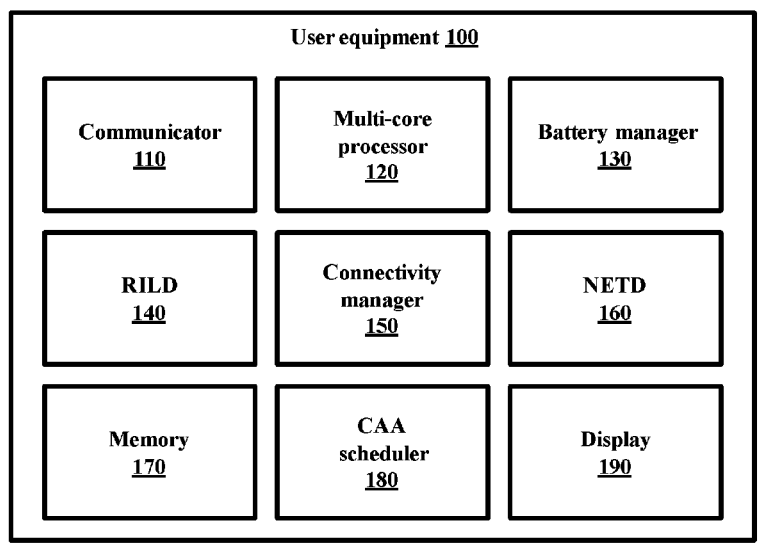
FIG. 2A is a block diagram of the UE 100 for providing a CLAT Aware Affinity (CAA) based scheduling on a multi-core processor 120, according to an embodiment as disclosed herein.

FIG. 2A is a block diagram of the user equipment (UE) 100 for providing the CAA based scheduling on the multi-core processor 120, according to an embodiment as disclosed herein.

Referring to the FIG. 2A, the UE 100 may be fixed or mobile and may also be called by another term, such as a Mobile Station (MS), a User Terminal (UT), a Subscriber Station (SS), a wireless device, a Personal Digital Assistant (PDA), a wireless modem, a handheld device, or an Access Terminal (AT). In an embodiment, the UE 100 can be, for example, a mobile phone, a smart phone, Personal Digital Assistants (PDAs), a tablet, a wearable device, an Internet of things (IoT) device, etc.

The UE 100 includes a communicator 110, a multi-core processor 120, a battery manager 90, a Radio Interface Layer Daemon (RILD) 140, a Connectivity manager 150, a Network Daemon (NETD) 160, a memory 170, a CAA scheduler 180 and a display 190.

In an embodiment, the communicator 110 is configured to receive the packets. The communicator 110 is also configured to send and receive signals by the UE 100.

In an embodiment, the multi-core processor 120 is made up of plurality of cores with interconnections between individual cores. The plurality of cores may be referred to collectively, or in general, as cores. The multi-core processor 120 can be configured to read from and/or write to the memory 170. Such read and write operations may relate to both instructions and data associated with operations of the plurality of cores of the multi-core processor 120. Further, each of the cores within the multi-core processor 120 may be configured to individually access the memory 170. The signaling between the plurality of cores is achieved by generating software driven hardware interrupts to the plurality of cores.

In an embodiment, the battery manager 90 is configured to provide the method for querying a battery and charging properties of the battery of the UE 100.

In an embodiment, the Radio Interface Layer Daemon (RILD) 140 is configured to determine and share information related to radio characteristics of the UE 100 such as signal strength, a signal to noise ratio, etc.

In an embodiment, the connectivity manager 150 is configured to determine and send information related to a state of network connectivity of the UE 100. The connectivity manager 150 is also configured to notify an application running on the UE 100 when the network connectivity changes.

In an embodiment, the Network Daemon (NETD) 160 is a hardware abstraction layer in an operating system which is capable of fetching interface information and other network management parameters.

In an embodiment, the memory 170 can include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory 170 may, in some examples, be considered a non-transitory storage medium. The term "non-transitory" may indicate that the storage medium is not embodied in a carrier wave or a propagated signal. However, the term "non-transitory" should not be interpreted that the memory 170 is non-movable. In some examples, the memory 170 can be configured to store larger amounts of information than the memory. In certain examples, a non-transitory storage medium may store data that can, over time, change (e.g., in Random Access Memory (RAM) or cache).

In an embodiment, the CAA scheduler 180 is configured to classify the packet into the at least one class of the class A, the class B and the class C based on the IP header of the packet. Further, the CAA scheduler 180 is also configured to schedule the packet on the at least one core of the multi-core processor 120 based on the at least one of the high priority queue, the intermediate priority queue and the low priority queue. The high priority queue, the intermediate priority queue and the low priority queue is determined based on the at least one class into which the packet is classified.

In an embodiment, the display 190 is configured to provide display state, such as on or off on a portion of a screen or the whole area of the screen.

Although the FIG. 2A shows the hardware elements of the UE 100 but it is to be understood that other embodiments are not limited thereon. In other embodiments, the UE 100 may include less or more number of elements. Further, the labels or names of the elements are used only for illustrative purpose and does not limit the scope of the invention. One or more components can be combined together to perform same or substantially similar function for enabling interaction on UE 100.

Figure 2B:
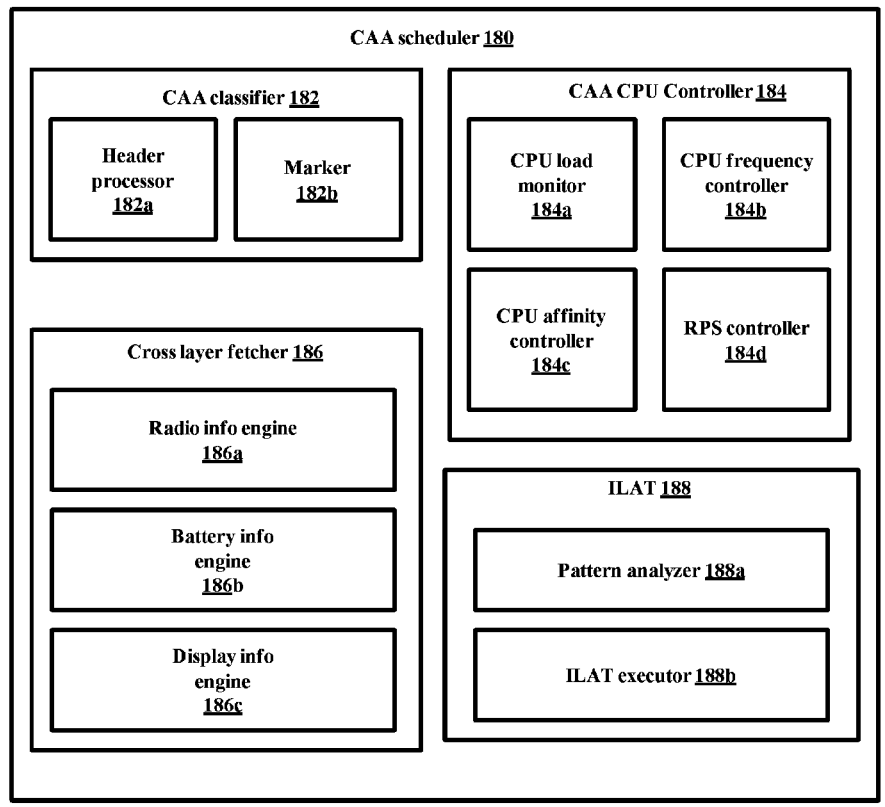
FIG. 2B is a block diagram of a CAA scheduler 180 for providing the CAA based scheduling on the multi-core processor 120 of the UE 100, according to an embodiment as disclosed herein.

FIG. 2B is a block diagram of the CAA scheduler 180 for providing the CAA based scheduling on the multi-core processor 120 of the UE 100, according to an embodiment as disclosed herein.

The CAA scheduler 180 includes a CAA classifier 182, a CAA CPU Controller 184, a Cross layer fetcher 186 and an intelligent learning based translator (ILAT) 188. The CAA CPU Controller 184 includes a CPU load monitor 184a, a CPU FREQ controller 184b, a CPU affinity controller 184c and a RPS controller 184d.

In an embodiment, the CAA classifier 182 includes a header processor 182a and a marker 182b. The header processor 182a is configured to determine the IP header of the packet. The header processor 182a also determines whether the packet contains the IPv4 prefix, the IPv6 prefix or none of the IPv4 prefix and the IPv6 prefix. Further, the header processor 182a classifies the packets based on the header. The marker 182b marks the packet with the respective class as belonging to one of classes of the class A, the class B and the class C after decoding the header of the packet.

In an embodiment, the CAA CPU Controller 184 includes a CPU load monitor 184a, a CPU frequency controller 184b, a CPU affinity controller 184c and a receive packet steering (RPS) controller 184d.

The CPU load monitor 184*a* is configured to internally monitor a current load of each of the CPUs. The CPU frequency controller 184*b* is configured to perform one of an increase or a decrease of the CPU frequency depending on the load of the CPU. Further, the CPU frequency controller 184*b* dynamically controllers the CPU frequency of each of the cores of the multi-core processor 120. Therefore, the CPU frequency controller 184*b* enables an increase in a per CPU frequency when there is a higher demand for throughput.

The CPU affinity controller 184*c* is configured to determine a processor affinity based on the classification, along with the determined priority of the packet. The determination of the processor affinity helps to achieve maximum performance.

The RPS controller 184*d* is configured to schedule the connections/packets accumulated in the queue and processed by the at least one core of the multi-core processor 120. The RPS controller 184*d* is configured to create a hash from the IP addresses and port numbers which is used to schedule the packet on the at least one of the multi-core processor 120. The RPS controller 184*d* assigns the packet queue to the at least one of the multi-core processor 120 and allows the parallel processing of the packet which increases the overall system utilization. The CAA CPU Controller 184 dynamically allocates and migrates the process/task between the at least one of the multi-core processor 120. The multi-core processor 120 includes a series of little cores and big cores. The CAA CPU Controller 184 CAA uses big core for process intensive task to increase bandwidth and throughput and uses little cores for less intensive task to minimize the power consumption and heat control.

In an embodiment, the Cross layer fetcher 186 is configured to fetch cross-layer information which includes at least one of radio information engine 186*a*, a battery information engine 186*b* and a display information engine 186*c*. The radio information engine 186*a* is configured to fetch the information of radio parameters such as a Radio Access Technology (RAT) Type, a RAT operational band, RAT architecture, signal strength, etc. The battery information engine 186*b* is configured to fetch the information related to the battery of the UE 100 such as a battery level, a battery health and battery charging information, etc. for power-efficient scheduling on the multi-core processor 120. The battery information is used to proportionally clock the CPU frequency. For example, consider that the throughput is intensive and the battery level is more than 80%. Then the CPU frequency is set to 90% of the maximum. In another example, if the battery level is critical or less than 15%, the CPU frequency is at-most set to 50% or only the little core is used by the CAA scheduler 180.

The display information engine 186*c* is configured to fetch the display state. The display state is one of:

a. ON/ON_SUSPEND/OFF display state: In this display state, the CAA scheduler 180 clocks the frequency and schedules the affinity among the plurality of cores of the multi-core processor 120 based on the other parameters.

b. DOZE/DOZE_SUSPEND display state: In this display state, the display dozes to low power state model. The UE 100 is non-interactive and requires more focus on power efficiency. Hence, the CAA scheduler 180 makes least effort in scheduling the packets. The proposed method includes a CAA-LITE mode when the UE100 is in the DOZE/DOZE_SUSPEND state to enable higher amount of power saving.

c. STATE_UNKNOWN display state: In this display state, the state of the display is unknown and hence the CAA scheduler 180 utilized the default processing mechanism of the data packets.

In an embodiment, the ILAT 188 is a machine learning based XLATing service operating in the UE 100. The ILAT 188 operates between the application and a transport layer of an open systems interconnection model (OSI model). The ILAT 188 includes a pattern analyzer 188*a* and an ILAT executor 188*b*. The pattern analyzer 188*a* is configured to learn user history and use the user history to control the DNS patterns. The ILAT 188 monitors DNS queries, TCP connections, path characteristics and CPU patterns. The ILAT 188 is also configured to monitor application pattern, the UE 100 condition such as dual stack, battery, SIOP, CPU performance, RAT connected, etc.

Further, ILAT executor 188*b* is configured to determine the at least one of the IPv4 connection and the IPv6 connection based on the path characteristic of the packet and establish a connection to at least one of the IPv4 server and the IPv6 server based on the determined at least one of the IPv4 connection and the IPv6 connection. The establishing of the connection to at least one of the IPv4 server and the IPv6 server includes performing one of connecting to the IPv4 server in response to determining that the IPv6 server is absent, connecting to the IPv6 server only in response to determining that the performance of the IPv6 server and the performance of the IPv4 server are equal, and connecting to the IPv4 server in response to determining that the performance of the IPv4 server is better than the performance of the IPv6 server.

Figure 2C:
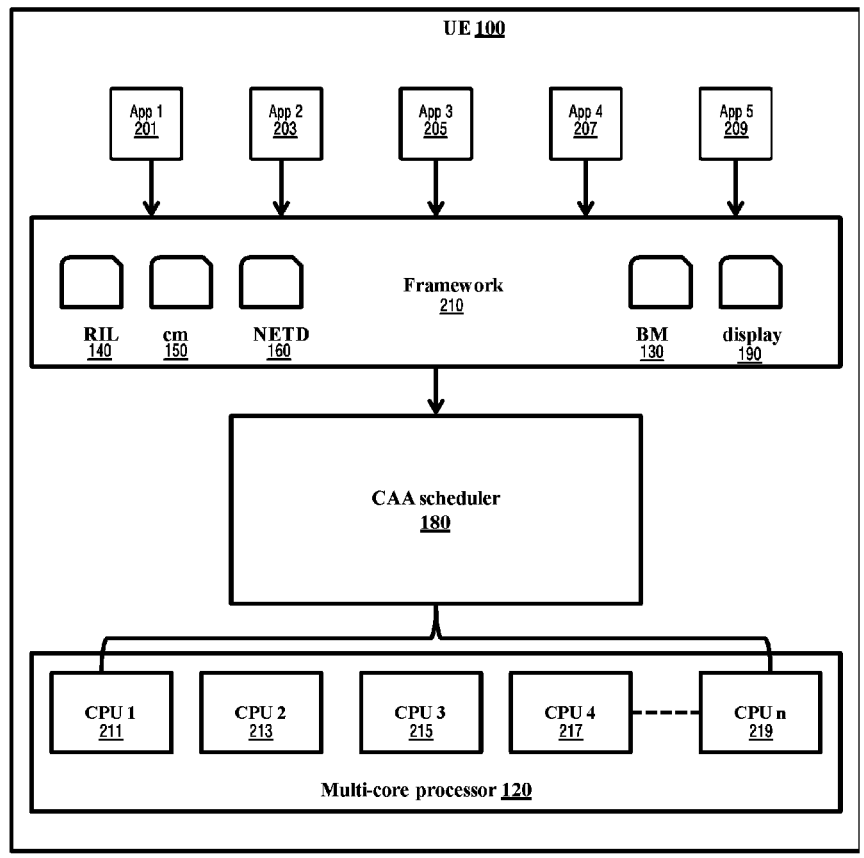
FIG. 2C illustrates a system architecture of the UE 100 for providing the CAA based scheduling on the multi-core processor 120, according to an embodiment as disclosed herein.

FIG. 2C illustrates the system architecture of the UE 100 for providing the CAA based scheduling on the multi-core processor 120, according to an embodiment as disclosed herein.

Figure 3A:
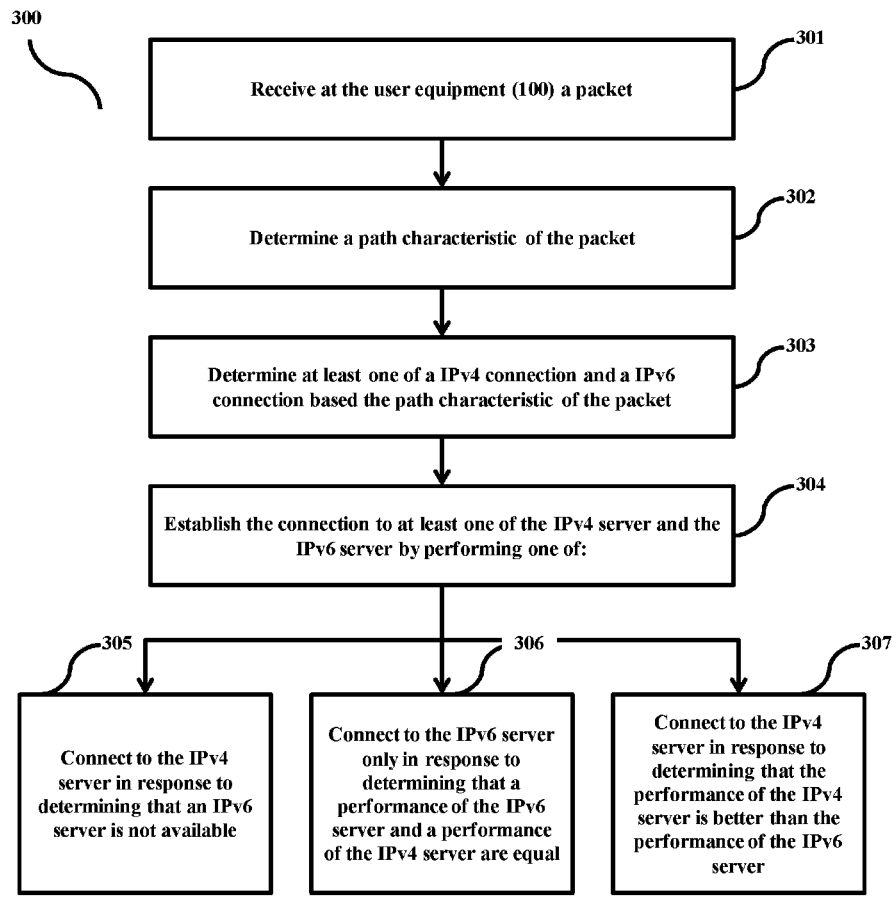
FIG. 3A is a flow chart illustrating a method for establishing a connection to at least one of a IPv4 server and a IPv6 server, according to an embodiment as disclosed herein.
Figure 3B:
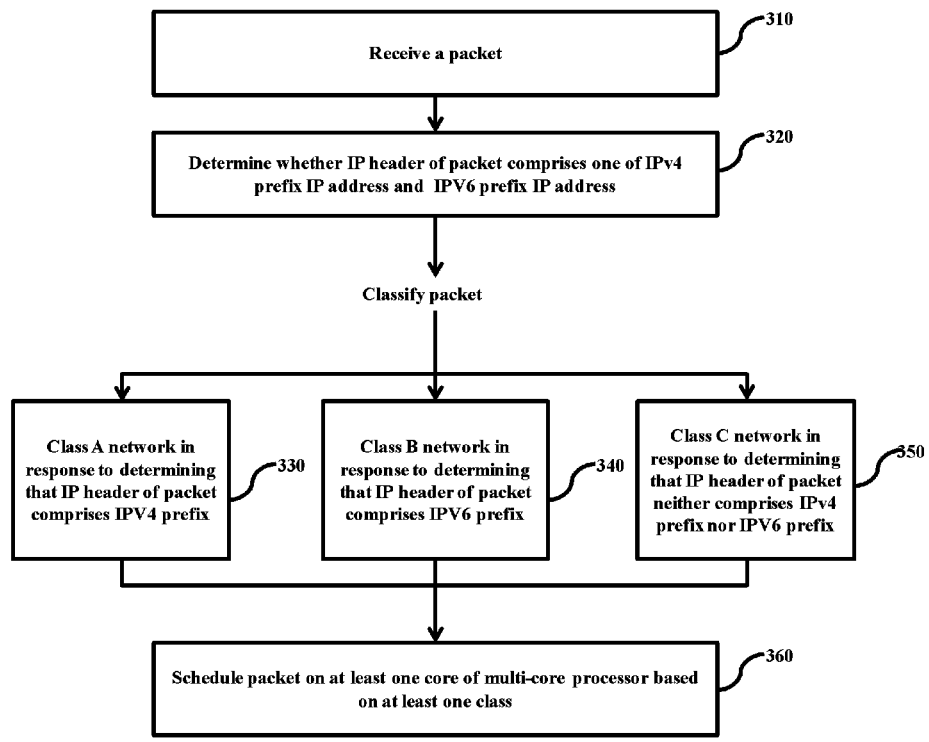
FIG. 3B is a flow chart illustrating a method for the CAA based scheduling by the UE 100 comprising the multi-core processor 120, according to an embodiment as disclosed herein.
Figure 3C:
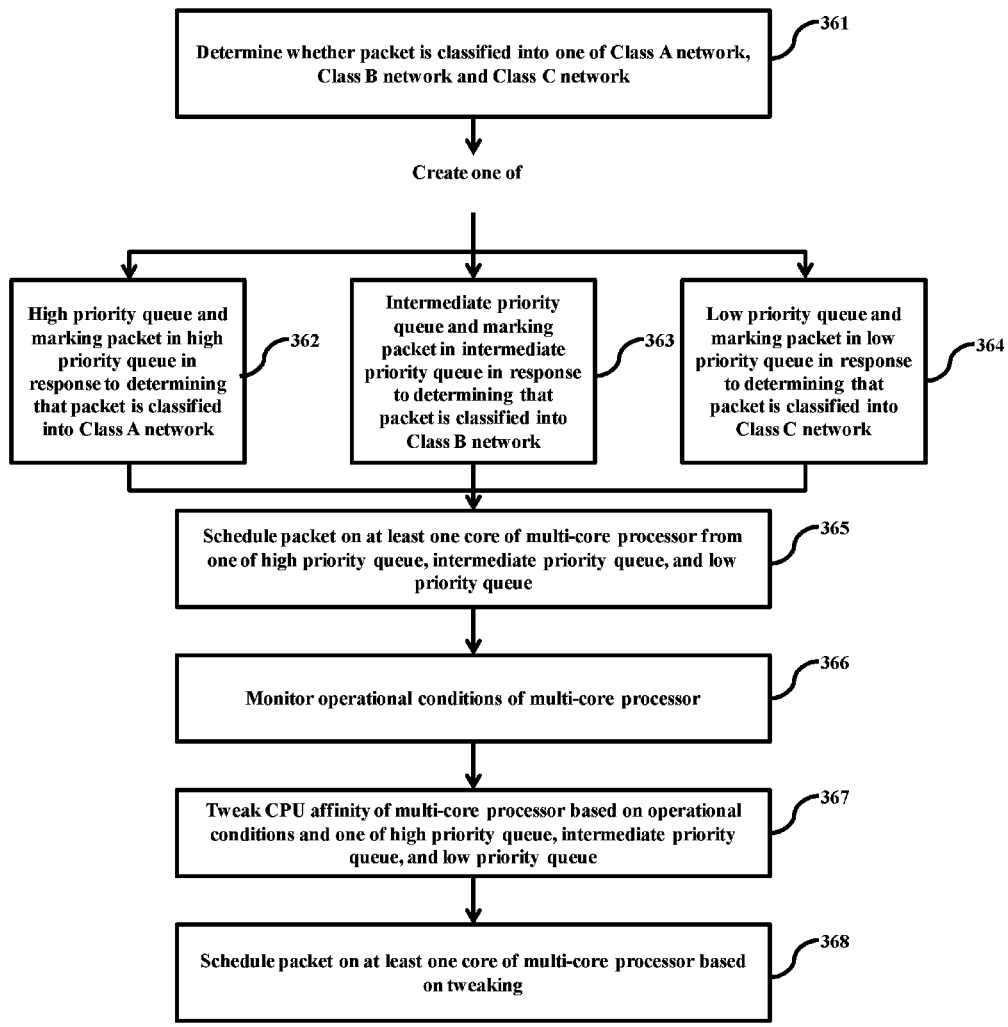
FIG. 3C is a flow chart illustrating a method for scheduling a packet on at least one core of the multi-core processor 120 based on at least one class, according to an embodiment as disclosed herein.

Referring to the FIG. 2C, the proposed system architecture is modular and comprises various functional components as depicted in FIG. 3C. The CAA scheduler 180 schedules the packets received from each of the applications based on the IP header. The packet arrival is considered to be a Poisson distribution which is then used to derive the throughput from an average arrival time of the packets and the packet loss detection. The Poisson arrival model followed by the CAA Scheduling Algorithm is as follows:

CAA queue estimation: Consider that the packets arriving at the CAA scheduler 180 have exponentially distributed inter-arrival time, i.e., Poisson arrival at a sub-second interval.

In general, the TCP traffic follows the Poisson distribution and a certain UDP based traffic. Consider a service rate of the CAA schedule 180 is µ bits per sec. The packets arriving at the CAA schedule 180 are serviced on a class-based FIFO (first-in-first-out) queuing discipline for a fixed quantum. There are pluralities of applications (i.e., App1, App2, App3, etc) which are running on the UE 100 and the plurality of applications has opened multiple sockets. For a packet in a socket i the mean arrival rate of the packet is given by M. Therefore, the total mean arrival rate λ at the CAA schedule 180 is $$\lambda = \Sigma_{i=1}^{n} \lambda_i \tag{1}$$

In order to obtain the best effort utilization the total mean arrival rate must be always less than the service rate of the scheduler i.e., $\lambda \leq \mu$. The service rate of the socket i can be written as $$\alpha_i = \frac{\lambda_i}{\lambda}\mu \quad (2)$$

The service time is a deterministic time D serving at rate $$\mu = \frac{1}{D}.$$

The service duration of packets in socket i with length L is $$D_i = \frac{L}{\lambda_i},$$

which is of fixed duration. Hence, we use M/D/1 queue model for the CAA scheduler 180 where the arrival rate is k, the service rate is μ and the utilization is ρ=λ/μ. For the packet in socket i, the average waiting time in the queue E [$W_i$] and the average time in the scheduler E [$T_i$] is given as $$E[W_i] = \frac{1}{2\mu}\left(\frac{\rho}{1-\rho}\right) \quad (3)$$

$$E[T_i] = \frac{1}{2\mu}\left(\frac{2-\rho}{1-\rho}\right) \quad (4)$$

The average time of the packet in the scheduler can also be obtained using the Little's Law:

$$E[T_i]=\lambda E[W_i] \quad (5)$$

The packet loss happens when a particular queue overflows i.e. ρ>1. This means that the packets are arriving faster than the packets can be serviced i.e., $$\sum_{i=1}^{n}\frac{1}{2\mu}\left(\frac{2-\rho}{1-\rho}\right) \quad (6)$$

From the packet loss due to queue overflow, the throughput of the packet and the processing capacity of each queue can be directly identified, in the proposed method.

CAA scheduling algorithm: The data from the CAA classifier 182 is used to determine the plurality of queues as shown in FIG. 7. The high priority queue contains the packets which are locally processed. Hence, the processing time and the packet delay are very low or negligible. The mid priority queue involves the packet transaction between the PLAT and the UE 100. The packet delay depends on the round trip time of the end server to the client.

The classified packets are processed in multiple queues which are in-turn affine to the plurality of the cores. The splitting up the packets by the CAA scheduler 180 with the classified information improves the throughput of the UE 100 by 1.2×. The processing of the packets increases the throughput by 80% and by dynamically allocation in the available cores of the plurality of cores, the throughput enhances by 90%. The main reason for the enhancement is the reduction in packet delay and packet drop to the application.

FIG. 3A is a flow chart 300 illustrating the method for establishing the connection to at least one of the IPv4 server and the IPv6 server, according to an embodiment as disclosed herein.

Referring to the FIG. 3A, at step 301, the UE 100 receives the packet. For example, in the UE 100 as illustrated in the FIG. 2A, the communicator 110 is configured to receive the packet.

At step 302, the UE 100 determines the path characteristic of the packet. For example, in the UE 100 as illustrated in the FIG. 2A, the CAA scheduler 180 is configured to determine the path characteristic of the packet.

At step 303, the UE 100 determines the at least one of the IPv4 connection and the IPv6 connection based the path characteristic of the packet. For example, in the UE 100 as illustrated in the FIG. 2A, the communicator 110 is configured to determine the at least one of the IPv4 connection and the IPv6 connection based the path characteristic of the packet.

At step 304, the UE 100 establish the connection to at least one of the IPv4 server and the IPv6 server by performing one of: connect to the IPv4 server in response to determining that an IPv6 server is not available, as shown in step 305. Connect to the IPv6 server only in response to determining that a performance of the IPv6 server and a performance of the IPv4 server are equal, as shown in step 306 and connect to the IPv4 server in response to determining that the performance of the IPv4 server is better than the performance of the IPv6 server, as shown in step 306.

The various actions, acts, blocks, steps, or the like in the method may be performed in the order presented, in a different order or simultaneously. Further, in some embodiments, some of the actions, acts, blocks, steps, or the like may be omitted, added, modified, skipped, or the like without departing from the scope of the invention.

FIG. 3B is a flow chart illustrating the method for CAA based scheduling by the UE 100 comprising the multi-core processor 120, according to an embodiment as disclosed herein.

Referring to the FIG. 3B, at step 310, the UE 100 receives the packet. For example, in the UE 100 as illustrated in the FIG. 2A, the communicator 110 is configured to receive the packet.

At step 320, the UE 100 determines whether the IP header of the packet comprises one of the IPv4 prefix IP address and the IPV6 prefix IP address. For example, in the UE 100 as illustrated in the FIG. 2A, the CAA scheduler 180 is configured to determine whether the IP header of the packet comprises one of the IPv4 prefix IP address and the IPV6 prefix IP address.

At step 330, the UE 100 classifies the packet into the class A network in response to determining that the IP header of the packet comprises the IPV4 prefix. For example, in the UE 100 as illustrated in the FIG. 2A, the CAA scheduler 180 is configured to classify the packet into the class A network in response to determining that the IP header of the packet comprises the IPV4 prefix.

At step 340, the UE 100 classifies the packet into the Class B network in response to determining that the IP header of the packet comprises the IPV6 prefix. For example, in the UE 100 as illustrated in the FIG. 2A, the CAA scheduler 180 is configured to classify the packet into the Class B network in response to determining that the IP header of the packet comprises the IPV6 prefix.

At step 350, the UE 100 classifies the packet into the Class C network in response to determining that the IP header of packet neither comprises the IPv4 prefix nor the IPV6 prefix. For example, in the UE 100 as illustrated in the FIG. 2A, the CAA scheduler 180 is configured to classify the packet into the Class C network in response to determining that the IP header of packet neither comprises the IPv4 prefix nor the IPV6 prefix.

At step 360, the UE 100 schedules the packet on at least one core of the multi-core processor 120 based on the at least one class. For example, in the UE 100 as illustrated in the FIG. 2A, the CAA scheduler 180 is configured to schedule the packet on at least one core of the multi-core processor 120 based on the at least one class.

The various actions, acts, blocks, steps, or the like in the method may be performed in the order presented, in a different order or simultaneously. Further, in some embodiments, some of the actions, acts, blocks, steps, or the like may be omitted, added, modified, skipped, or the like without departing from the scope of the invention.

FIG. 3C is a flow chart illustrating the method for scheduling the packet on the at least one core of the multi-core processor 120 based on the at least one class, according to an embodiment as disclosed herein.

Referring to the FIG. 3C, at step 361, the UE 100 determines whether the packet is classified into one of the Class A network, the Class B network and the Class C network. For example, in the UE 100 as illustrated in the FIG. 2A, the CAA scheduler 180 is configured to determine whether the packet is classified into one of the Class A network, the Class B network and the Class C network.

At step 362, the UE 100 creates the high priority queue and marks the packet in the high priority queue in response to determining that the packet is classified into the Class A network. For example, in the UE 100 as illustrated in the FIG. 2A, the CAA scheduler 180 is configured to create the high priority queue and marks the packet in the high priority queue in response to determining that the packet is classified into the Class A network.

At step 363, the UE 100 creates the intermediate priority queue and marks the packet in the intermediate priority queue in response to determining that the packet is classified into the Class B network. For example, in the UE 100 as illustrated in the FIG. 2A, the CAA scheduler 180 is configured to create the intermediate priority queue and marks the packet in the intermediate priority queue in response to determining that the packet is classified into the Class B network.

At step 364, the UE 100 creates the low priority queue and marks the packet in the low priority queue in response to determining that the packet is classified into the Class C network. For example, in the UE 100 as illustrated in the FIG. 2A, the CAA scheduler 180 is configured to create the low priority queue and marks the packet in the low priority queue in response to determining that the packet is classified into the Class C network.

At step 365, the UE 100 schedules the packet on the at least one core of the multi-core processor 120 from one of the high priority queue, the intermediate priority queue, and the low priority queue. For example, in the UE 100 as illustrated in the FIG. 2A, the CAA scheduler 180 is configured to schedule the packet on the at least one core of the multi-core processor 120 from one of the high priority queue, the intermediate priority queue, and the low priority queue.

At step 366, the UE 100 monitors the operational conditions of the multi-core processor 120. For example, in the UE 100 as illustrated in the FIG. 2A, the CAA scheduler 180 is configured to monitor the operational conditions of the multi-core processor 120.

At step 367, the UE 100 tweaks the CPU affinity of the multi-core processor 120 based on the operational conditions and one of the high priority queue, the intermediate priority queue and the low priority queue. For example, in the UE 100 as illustrated in the FIG. 2A, the CAA scheduler 180 is configured to tweak the CPU affinity of the multi-core processor 120 based on the operational conditions and one of the high priority queue, the intermediate priority queue and the low priority queue.

At step 368, the UE 100 schedules the packet on the at least one core of the multi-core processor 120 based on the modifying. For example, in the UE 100 as illustrated in the FIG. 2A, the CAA scheduler 180 is configured to schedules the packet on the at least one core of the multi-core processor 120 based on the modifying.

The various actions, acts, blocks, steps, or the like in the method may be performed in the order presented, in a different order or simultaneously. Further, in some embodiments, some of the actions, acts, blocks, steps, or the like may be omitted, added, modified, skipped, or the like without departing from the scope of the invention.

Figure 4:
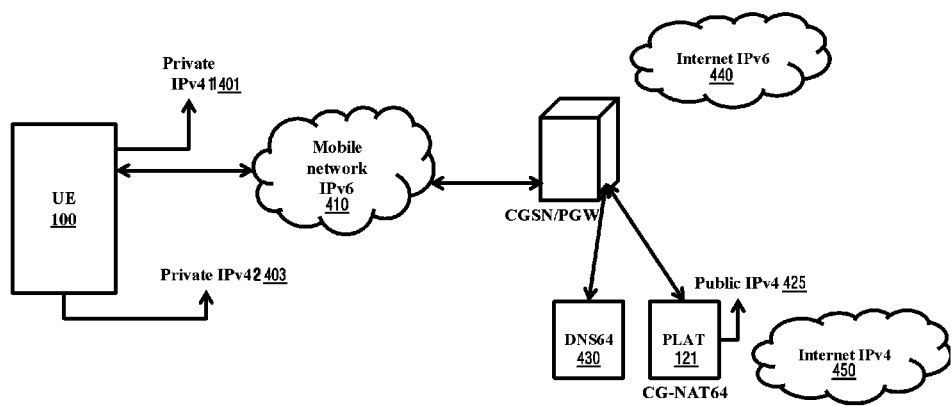
FIG. 4 illustrates a CLAT-PLAT Architecture, according to embodiments as disclosed herein.

FIG. 4 illustrates the CLAT-PLAT Architecture, according to embodiments as disclosed herein.

Referring to the FIG. 4, the CLAT architecture includes: Customer Side Translator (CLAT): runs inside the UE 100 implements the stateless protocol translation and the CLAT offers private IPv4 address. The IPv4 application uses the CLAT and the IPv4 addresses are translated to IPv6 by the CLAT. Further, the destination of the packet is determined using the PREF64/n and the IPv4 address determined by the CLAT.

The native IPv6: The websites which have the IPv6 address enabled are directly routed towards the IPv6 server.

The DNS64 is a mechanism for synthesizing the IPv6 address (AAAA) resource records from the IPv4 address (A) records if the AAAA response and forwards to the client or else, the DNS64 embeds the IPv4 address in the AAAA response.

The Provider Side Translator (PLAT) runs inside the Operator Backhaul implements the stateful protocol translation. The PLAT translates a N:1 global IPv6 address to the public IPv4 address. The PLAT derives the target IPv4 address from the obtained IPv6 address. Further, the PLAT is also scalable.

Figure 5:
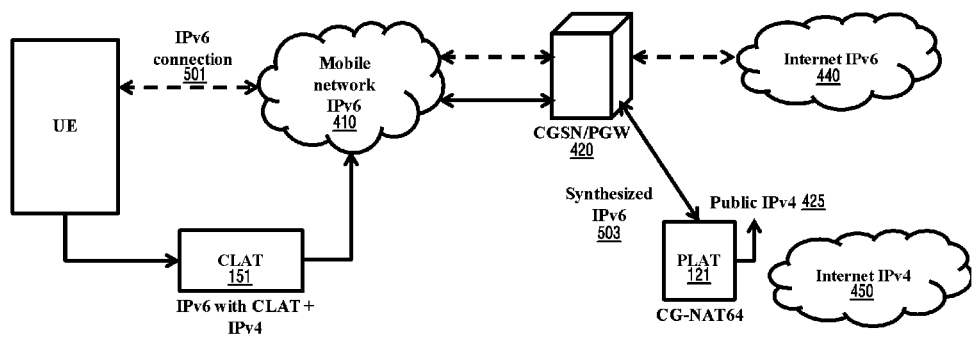
FIG. 5 illustrates a conventional mechanism of processing of packet in a Dual Stack architecture, according to the prior art.

FIG. 5 illustrates the conventional mechanism of processing of data in the Dual Stack architecture, according to the prior art.

Generally, about 91% of the connections in the conventional OS enabled UE 100 are short lived which consume about 32K data per session or less. A latency of less than 1 ms has to be guaranteed in 5G for tactile applications and any additional route may delay on average 5-8 ms and may go up to 400 ms, thereby reducing the throughput and impact the performance of the UE 100. Further, there could be processing overhead during address conversations from IPv4 to IPv6 and vice versa.

Most of the servers support both IPv4 addresses and IPv6 addresses. Hence best path among the IPv4 connection and IPv6 connection needs to be chosen. Broken locality is one of most critical problems seen in the tunneling process.

Referring to the FIG. 5, the complex processing of the data packets along with translation of the addresses is shown. One of the major drawbacks of the Dual Stack is that the requirement of both the IPv4 and the IPv6 infrastructure. As a result, the network operator is still required to manage IPv4 addresses as well as introduce support for IPv6 in the network. This increases operator costs since the operators must support and mange double IP addresses for all wireless devices in the network.

In another conventional method, for the IPv4 to the IPv6 transition in the packet core domain may include providing only the IPv6 address to each terminal. Further, an address translation mechanism is used in all the domain name service (DNS) lookup of the IPv4 server, such as a DNS64, that translates the address of the IPv4 packet into a "synthetic" IPv6 address. The synthetic IPv6 address may contain the target IPv4 address. Further, the translation of the IPv4 address into the IPv6 address may be done in an external NAT64 that is addressed by the IPv6 address returned by the DNS64. In another conventional method, some applications use the IPv4 addresses natively. For the UE 100 that support 464XLAT technology through a CLAT mechanism, the UE 100 translates the IPv4 address into the IPv6 (stateless XLAT) address towards the NAT64.

In the proposed method the UE 100 selects the IPv4 server or the IPv6 server only based on the connect time which is not applicable in the conventional XLAT architecture.

Figure 6A:
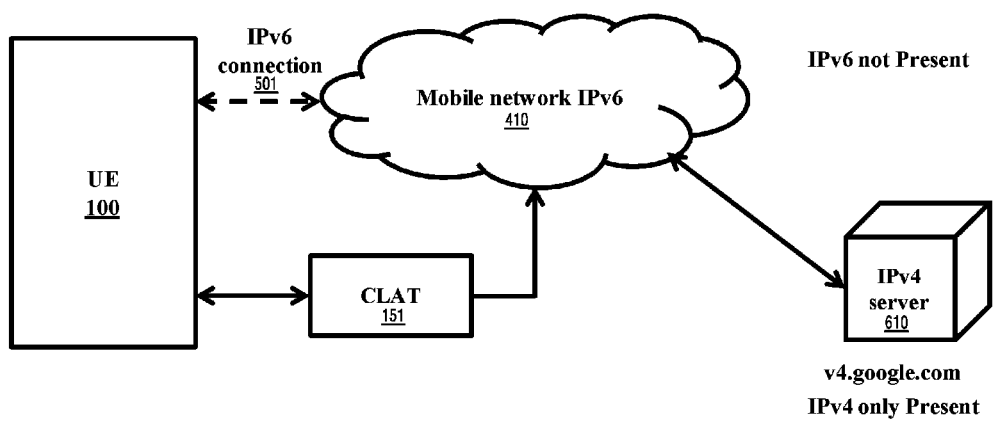
FIG. 6A illustrates an example scenario where an IPv6 server is absent, according to prior art.

FIG. 6A illustrates an example scenario where the IPv6 server is absent, according to prior art.

Consider a scenario where the IPv6 server is absent. Then the end server would be with the IPv4 only, as shown in FIG. 6A. In many countries such as for example, India 80% of the applications does not have IPv6 servers. Hence, in such a scenario, the proposed method of the UE 100 providing the CAA based scheduling though is utilized as there is no additional DNS query time involved.

Figure 6B:
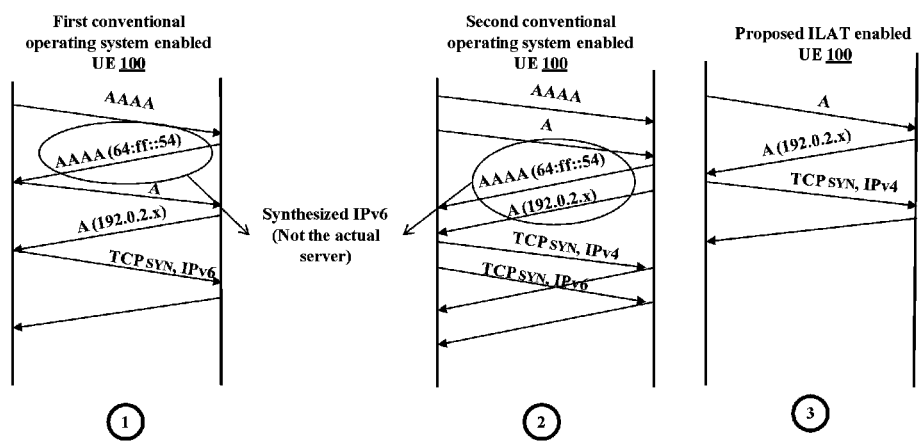
FIG. 6B illustrates an example scenario of connecting to an IPv4 server in response to determining that the IPv6 server is absent, according to embodiments as disclosed herein.

FIG. 6B illustrates an example scenario of connecting to the IPv4 server in response to determining that an IPv6 server is absent, according to embodiments as disclosed herein.

Referring to the FIG. 6B consider three cases:

1. A first conventional operating system enabled UE 100 which doesn't have the happy eyeball enabled.
2. A second conventional operating system enabled UE 100 which has the happy eyeball enabled.
3. An ILAT enabled UE 100 which runs the proposed ILAT solution.

In general, the DNS64 is a mechanism for synthesizing AAAA resource records (RRs) from A RRs. A synthetic AAAA RR created by the DNS64 from an original A RR contains the same owner name of the original A RR, but it contains an IPv6 address instead of an IPv4 address. When the IPv6 is not present, then the DNS64 server converts the IPv4 to synthesized IPv6 and sends the response.

In the first case, the first conventional OS enabled UE 100 connects to the IPv6 server. In the second case, the second conventional OS enabled UE 100 connects to one of the IPv6 server and the IPv4 server. In the third case, the proposed ILAT enabled UE 100 connects to the IPv4 server only.

The proposed ILAT enabled UE 100 when compared with the first conventional OS enabled UE 100, one RTT (DNS) and one connection resource (IPv6 DNS socket) provides better saving. Further, the proposed ILAT enabled UE 100 when compared with the second conventional OS enabled UE 100 avoids the IPv6 connection and two connection resources (IPv6 DNS and IPv6 TCP Socket).

Figure 7A:
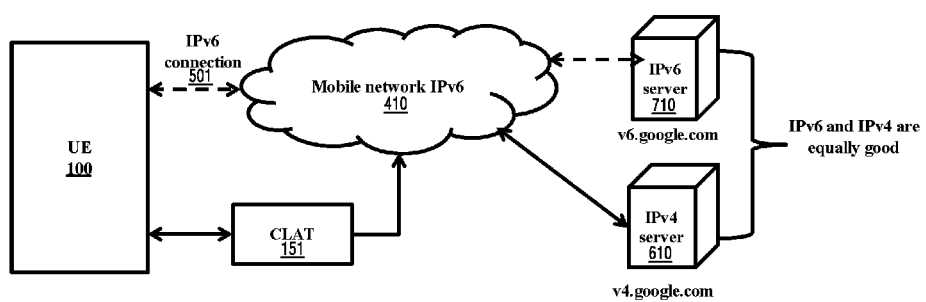
FIG. 7A illustrates an example scenario where a performance of the IPv6 server and a performance of the IPv4 server are equally good, according to prior art.

FIG. 7A illustrates an example scenario where a performance of the IPv6 server and a performance of the IPv4 server are equally good, according to prior art.

Consider the scenario where the IPv6 and the IPv4 are equally good. In the conventional server, the same Round-Trip-Time (RTT) and the TP are provided in both the IPv6 and the IPv4. However, in the proposed method, the direct IPv6 is preferred to avoid the CLAT overhead.

Figure 7B:
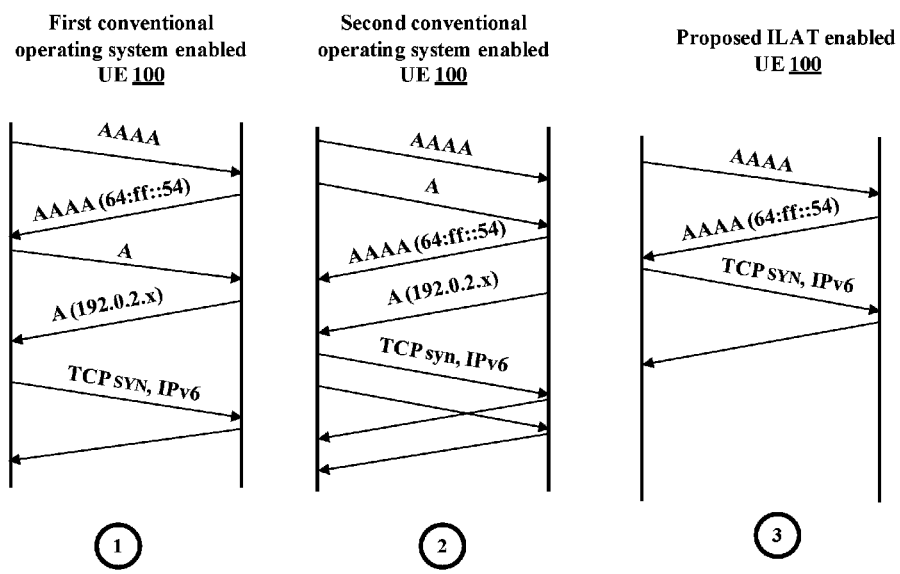
FIG. 7B illustrates an example scenario of connecting to the IPv6 server only, in response to determining that the performance of the IPv6 server and the performance of the IPv4 server are equal, according to embodiments as disclosed herein.

FIG. 7B illustrates an example scenario of connecting to the IPv6 server only, in response to determining that a performance of the IPv6 server and a performance of the IPv4 server are equal, according to embodiments as disclosed herein.

Consider a server which does not provide much difference between the IPv4 server performance and IPv6 server performance. Conventionally, the first conventional OS enabled UE 100 connects to the IPv6 server, the second conventional OS enabled UE 100 connects to one of the IPv6 server and the IPv4 server; and the proposed ILAT enabled UE 100 connects to the IPv4 server only.

The proposed ILAT enabled UE 100 when compared with the first conventional OS enabled UE 100, one RTT (DNS) and one connection resource (IPv4 DNS socket) provides better saving.

The proposed ILAT enabled UE 100 when compared with the second conventional OS enabled UE 100:

a) If connected to IPv4: 2 Connection resource (IPv6 DNS and IPv6 TCP Socket) and CLAT double processing overhead.

b) If connected to IPv6: 2 connection resources (IPv6 DNS and IPv6 TCP Socket). The proposed method provides double CLAT processing leading to reduced throughput and the CLAT header level overhead.

Figure 8A:
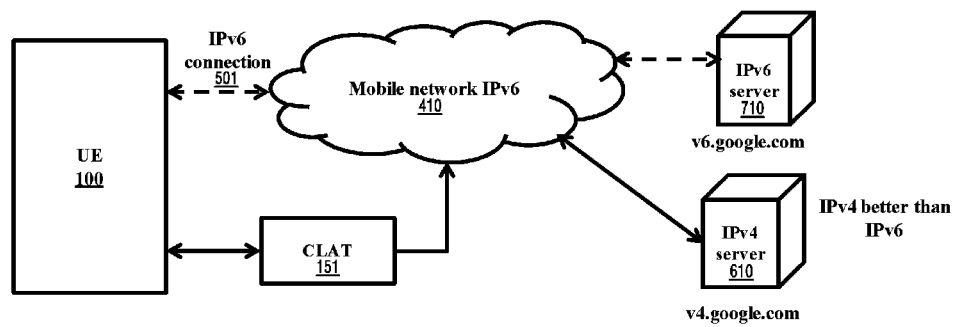
FIG. 8A illustrates an example scenario where the IPv6 server is present but the performance of the IPv4 server is better than the performance of the IPv6 server, according to prior art.

FIG. 8A illustrates an example scenario where the IPv6 server is present but the performance of the IPv4 server is better than the performance of the IPv6 server, according to prior art.

Referring to the FIG. 8A, some of the servers of the plurality of server have the IPv4 enabled and some other servers of the plurality of server have the IPv6 enabled. But the IPv6 server is present. However, the performance of the IPv6 enabled server is not as good as the performance of IPv4 enabled server i.e., the RTT difference is greater than 20 ms, in the conventional method.

In, the proposed method the UE 100 provides the CAA based scheduling though there is overhead issue.

Figure 8B:
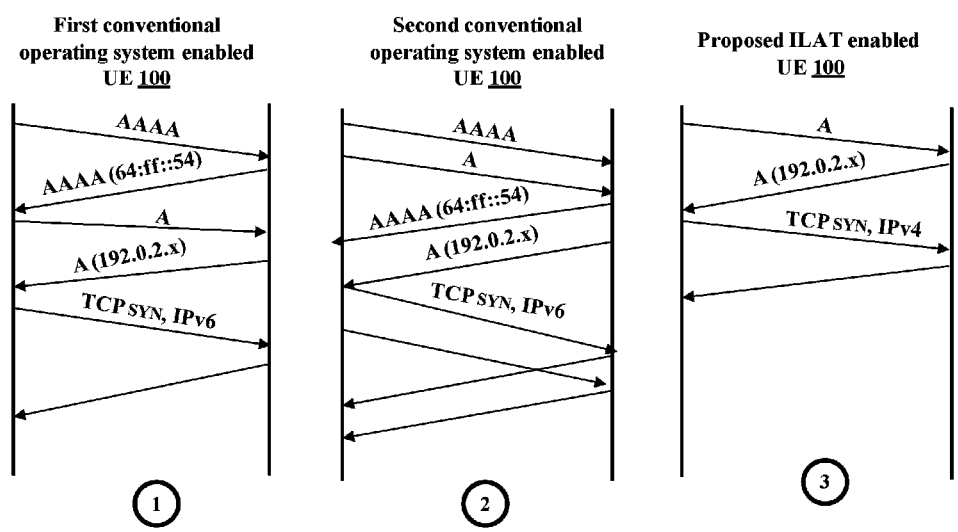
FIG. 8B illustrates an example scenario of connecting to the IPv4 server in response to determining that the performance of the IPv4 server is better than the performance of the IPv6 server, according to embodiments as disclosed herein.

FIG. 8B illustrates an example scenario of connecting to the IPv4 server in response to determining that the performance of the IPv4 server is better than the performance of the IPv6 server, according to embodiments as disclosed herein.

Consider that there is plurality of servers where the IPv4 performance is better than that of the IPv6 performance a server which does not provide much difference between the IPv4 server performance and IPv6 server performance. Further, in the above mentioned scenario, double processing can be neglected. Conventionally, the first conventional OS enabled UE 100 connects to the IPv6 server, the second conventional OS enabled UE 100 connects to one of the IPv6 server and the IPv4 server; and the proposed ILAT enabled UE 100 connects to the IPv4 server only.

The proposed ILAT enabled UE 100 when compared with the first conventional OS enabled UE 100, provides the RTT (DNS) and the 1 connection resource (IPv6 DNS socket).

The proposed ILAT enabled UE 100 when compared with the second conventional OS enabled UE 100, provides:

a) If connected to IPv6: 2 Connection resource (IPv4 DNS and IPv4 TCP Socket) and reduced throughput.

b) If connected to IPv4: 2 connection resources (IPv6 DNS and IPv6 TCP Socket).

Figure 9:
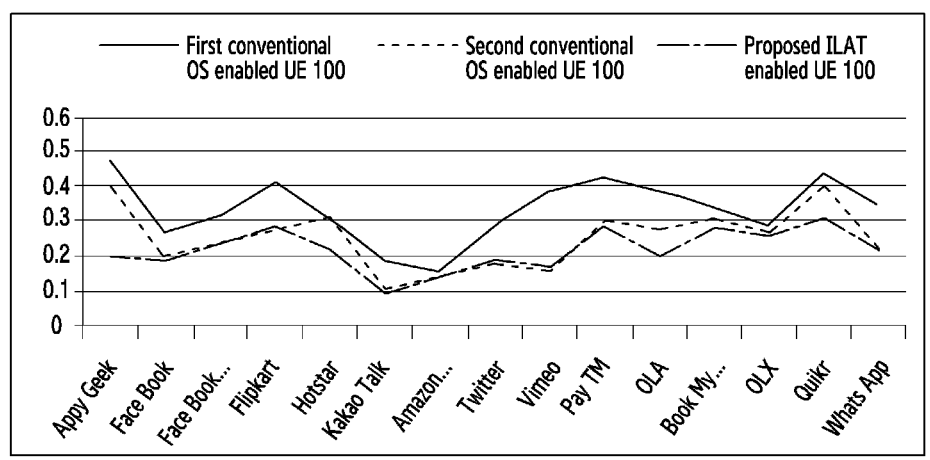
FIG. 9 illustrates a connection time comparison of a first conventional OS enabled UE 100, a second conventional OS enabled UE 100 and a proposed ILAT enabled UE 100, according to embodiments as disclosed herein.

FIG. 9 illustrates a connection time comparison of the first conventional OS enabled UE 100, the second conventional OS enabled UE 100 and the proposed ILAT enabled UE 100, according to embodiments as disclosed herein.

A parallel test with three UEs has been performed i.e., with the first conventional OS enabled UE 100, the second conventional OS enabled UE 100 and the proposed ILAT enabled UE 100. The connection time is used as performance evaluation parameter in the test.

Referring to the FIG. 9, the proposed ILAT enabled UE 100 always performs better than the first conventional OS enabled UE 100 (i.e., for example android). The proposed ILAT enabled UE 100 performs better than the second conventional OS enabled UE 100 (i.e., for example a happy eyeball) in at least 30% of the applications (as shown in FIG. 9). Another metrics that may be considered is the resource utilization. The proposed ILAT enabled UE 100 uses 50% less connection than the second conventional OS enabled UE 100 and 25% connection less than the first conventional OS enabled UE 100.

In the conventional android enabled UE 100, the happy eyeball is not implemented. Hence while evaluating with the proposed ILAT enabled UE 100, at least 1-RTT is saved (as explained in FIG. 6A-FIG. 8B).

The test is conducted in a network with high latency (50-100 ms). Hence, at least 100 ms is saved. For example in both the servers being best, and stable, due to reduced RTT, the PLT is 400 ms in the first OS enabled UE 100, the PLT with ILAT enabled UE 100 would be 300 ms. Hence 25% efficiency is obtained using the proposed method.

Further, the number of resources created is another important benchmark in conventional OS enabled UE 100, as it impacts the power consumption. One single application may on average open about 10-20 connections for surfing.

Hence, in the conventional OS, about 20 to 40 TCP connections are required and about 10-20 DNS queries are created. However, in the proposed ILAT enabled method, the number of TCP connections are reduced by half to about 10-20 TCP connection and the number of DNS queries also reduces to 5-10.

Figure 10A:
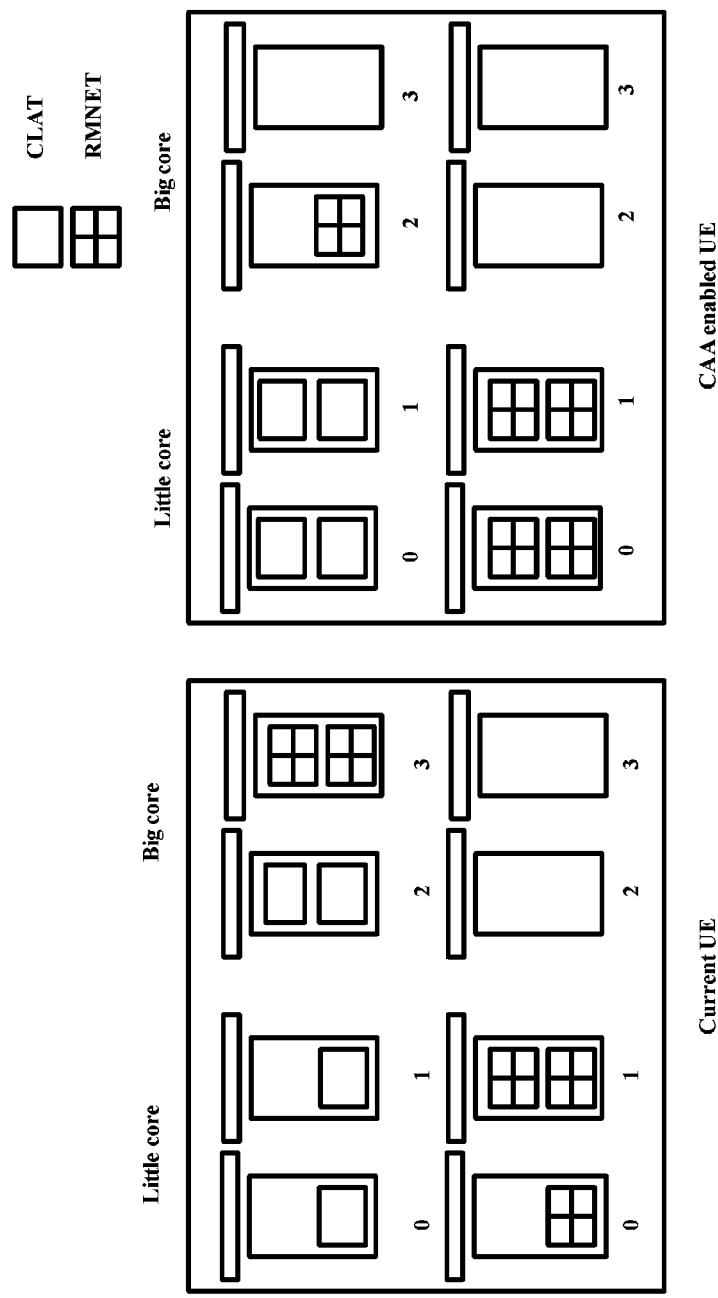
FIG. 10A illustrates a comparison of a processing of packets in a conventional UE 100 and in a CAA enabled UE 100, according to an embodiment as disclosed herein.

FIG. 10A illustrates a comparison of the processing of the packets in the conventional UE 100 and in the CAA enabled UE 100, according to an embodiment as disclosed herein.

Referring to the FIG. 10A, the processing of the packets in the conventional UE 100 and the CAA enabled UE 100 are both shown. In the conventional UE 100, the processing of the packets happens on both the little core and the big core. The profuse use of the big cores increases the processing time and the power consumption in the UE 100.

In the In the CAA enabled UE 100, the CAA scheduler 180 estimates the real-time CPU load and classifies the packets dynamically. The CAA enabled UE 100 computes the allocation and required processing time in the CAA scheduler 180 thereby adapt dynamically to the operational conditions thereby increasing the power efficiency.

Figure 10B:
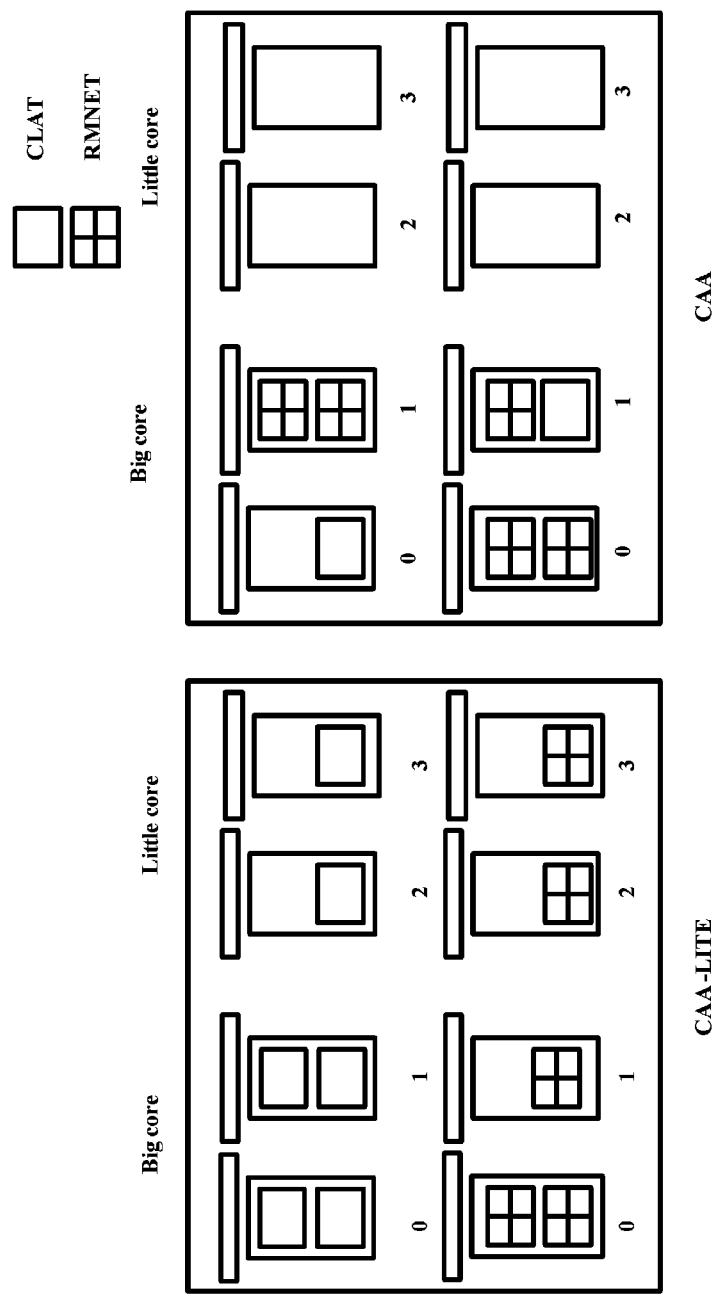
FIG. 10B illustrates a comparison of a processing of the packets in the CAA enabled UE 100 and a CAA LITE enabled UE 100, according to an embodiment as disclosed herein.

FIG. 10B illustrates a comparison of the processing of the packets in the CAA enabled UE 100 and the CAA LITE enabled UE 100, according to an embodiment as disclosed herein.

The proposed method includes two versions, i.e., processing of the packets in the CAA enabled UE 100 and the CAA LITE enabled UE 100.

In the CAA enabled UE 100, the CAA scheduler 180 estimates the real-time CPU load and classifies the packets dynamically. The CAA enabled UE 100 computes the allocation and required processing time in the CAA scheduler 180 thereby adapt dynamically to the operational conditions. Further, the CAA enabled UE 100 also fetches additional cross-layer information such as CPU conditions, battery state, radio parameters, display state to understand the UEs 100 status and schedules the packet to provide power efficiency.

The CAA LITE enabled UE 100 binds the CLAT packets in the CPU (0x0F) 4, 5, 6, 7 and non-CLAT packets in the CPU (0xF0) 0, 1, 2, 3. Irrespective of packet load or operational conditions all the CPU cores are made active and affinity is bind to above mentioned CPU core. Whereas, the CAA enabled UE 100 fetches the additional information and adapts dynamically to make the UE 100 power-efficient. In the FIG. 10B, only the little cores are used. The big cores are not made active until and unless required.

The CAA-LITE is a lightweight method, where the affinity of the CLAT packets is fixed with the specific CPU cores. In the CAA LITE enabled UE 100, the CAA scheduler 180 allocates the affinity of the CLAT packets with specific CPU cores with no additional information required. The objective of the CAA LITE version is to increase the throughput without considering the power consumption. Irrespective of the operational conditions, the CAA LITE always binds the CLAT and Non-CLAT packets to the respective CPU cores.

Figure 11:
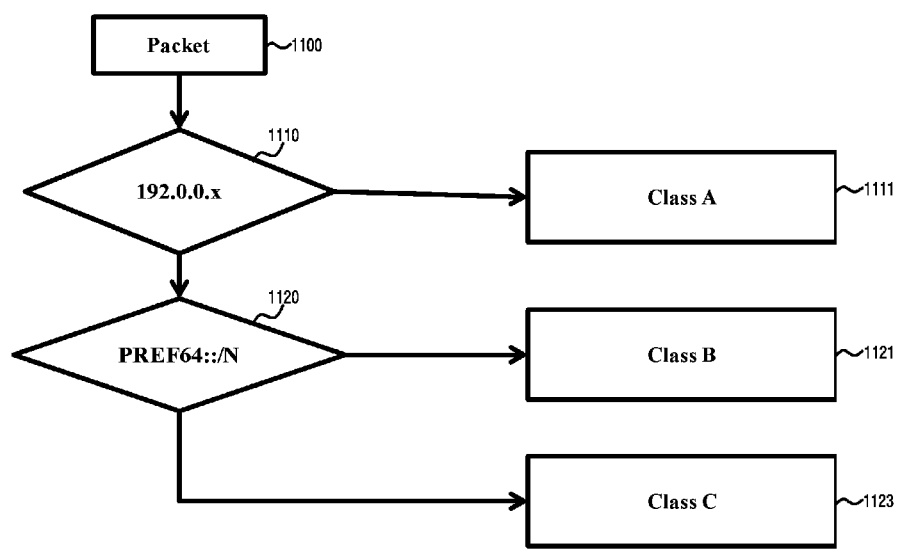
FIG. 11 illustrates a method of classifying the packet into at the least one class based on a IP header of the packet, according to an embodiment as disclosed herein.

FIG. 11 illustrates the method of classifying the packet into at the least one class based on the IP header of the packet, according to an embodiment as disclosed herein.

In order to effectively schedule the packets, the packets are first distinguished as the CLAT packet and the non-CLAT packet. Further, the CAA classifier 182 classifies the packets into the least one class of the three classes by processing the IP header of the packet, as shown in the FIG. 11.

The packets that are forwarded between the application and the CLAT daemon that are locally processed are classified as the class A. The packets that are transferred between the interface RMNET of the UE 100 and the PLAT server are classified as the class B. All the other packets, other than the packets classified as the class A and the class B, which includes the direct IPv6 live air connections and other local UNIX socket transfers, the packets are classified as the class C. Based on the classification of the packets, the packets are marked and the CAA scheduler 180 treats the packets based on the class of the packet.

Figure 12:
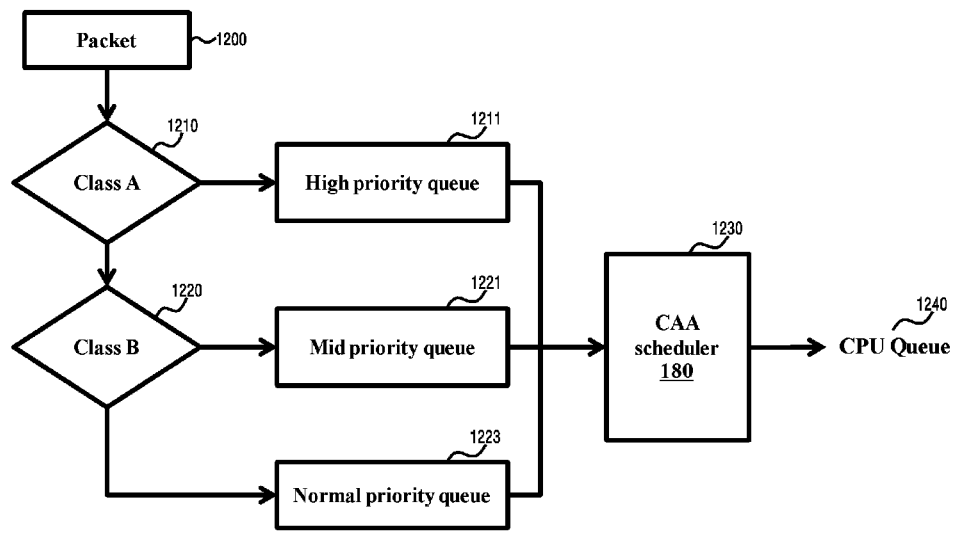
FIG. 12 illustrates the method of classifying the packets into one of a high priority queue, an intermediate priority queue, and a low priority queue and scheduling the packet based on the queue, according to an embodiment as disclosed herein.

FIG. 12 illustrates the method of classifying the packets into one of the high priority queue, the intermediate priority queue, and the low priority queue and scheduling the packet based on the queue, according to an embodiment as disclosed herein.

The CAA CPU controller 184 receives the packets which are classified into the at least one class of the class A, the class B and the class C from the CAA classifier 182. Referring to the FIG. 12, the packets classified into the at least one class is used to create the multiple queues.

The high priority queue includes the packets which are locally processed. Hence, the processing time and the packet delay are very low or negligible for the packets in the high priority queue. The mid priority queue includes the packet which are transacted between the PLAT and the UE 100. The packet delay depends on the round trip time of the end server to the client. The processing time is not as low as the high priority queue. The normal priority queue includes the packets processed as the other packets except the CLAT and the PLAT. The classified packets are processed in multiple queues which are in-turn affine to the plurality of cores of the multi-core processor 120.

The classification of the packets based on the classified information improves the throughput by 1.2×. The processing of the class A packets on a single core impacts the throughput by 80% and the dynamic allocation of the packets classified under the class A on the plurality of cores of the multi-core processor 120 impacts the throughput by 90%. The enhanced throughput is due to the reduction in the delay of the packet and the dropping of the packet to the application. If one of the cores of the multi-core processor 120 is empty or is running with a less load then the CAA scheduler 180 moves the connection from the core which is heavily loaded to the empty core or the core which is running with a less load. The core which is heavily loaded requires more processing time for using the RPS control which is avoided by the proposed method by moving the connection into the another core. The movement of the packets to the core from the heavily loaded core enhances the broken locality in a Linux kernel stack. Further, if there is plurality of cores having the same load, then the CAA scheduler 180 uses a round-robin paradigm to push the packet among the plurality of cores.

If the packets belonging to the same class or the packets belonging to same connection arrive at the CAA scheduler 180, then the CAA scheduler 180 would push the packets to the same core so that the global mapping table is unaffected. The cores can have two states i.e., an active state and an idle state. The CAA scheduler 180 achieves better power consumption by fine tuning a larger number of cores of the plurality of cores to be into the idle state. The CAA scheduler 180 achieves the better power consumption by two-levels of operations i.e., by the CPU frequency tuning and the CPU affinity modification.

The CAA scheduler 180 proportionally controls the CPU frequency based on the estimated packet arrival rate. Initially, all the little cores are fully utilized to process the data. The little cores can be used to process most of surfing an internet and video streaming applications. However, when there is intensive download, the CAA scheduler 180 uses level tuning. If the estimated packet loss in the active CPU is predicted to be higher i.e. if the active CPUs cannot handle the load of the data packets, then the big cores are also activated. Amongst the active CPUs, the packets from different class are processed according to the priority queue.

Figure 13:
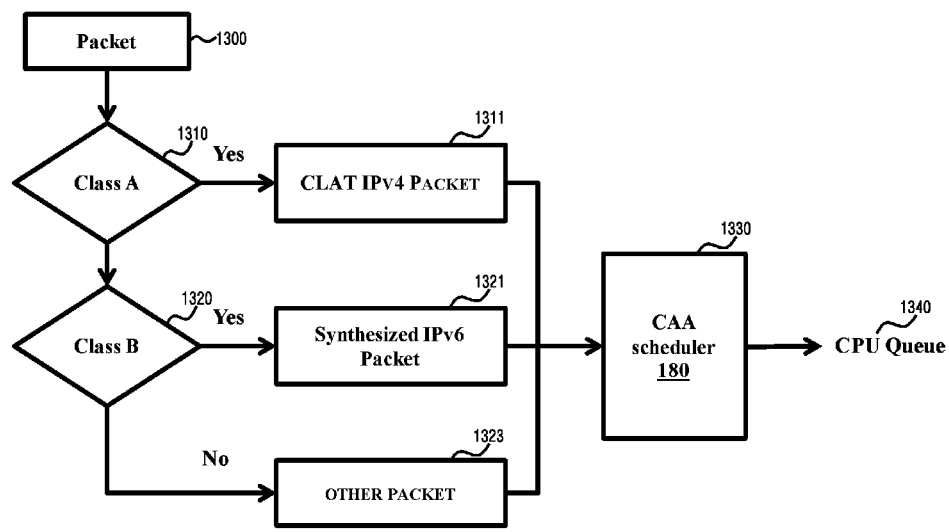
FIG. 13 illustrates classification of the packets in a Dual IP architecture without double processing of the packets, according to an embodiment as disclosed herein.

FIG. 13 illustrates classification of the packets in the Dual IP architecture without double processing of the data packets, according to an embodiment as disclosed herein.

In the conventional Dual IP architecture, one of the major drawbacks in the CLAT is the double processing of the data packets.

Referring to the FIG. 13, in the proposed method, the double processing of the packets are avoided by classifying the packets into at least one the classes based on the IP header and marking the packets with the respective IP header. Therefore, the proposed method avoids double processing of the packets and thereby provides enhanced design and optimization of the network performance of the Dual IP architecture.

Figure 14:
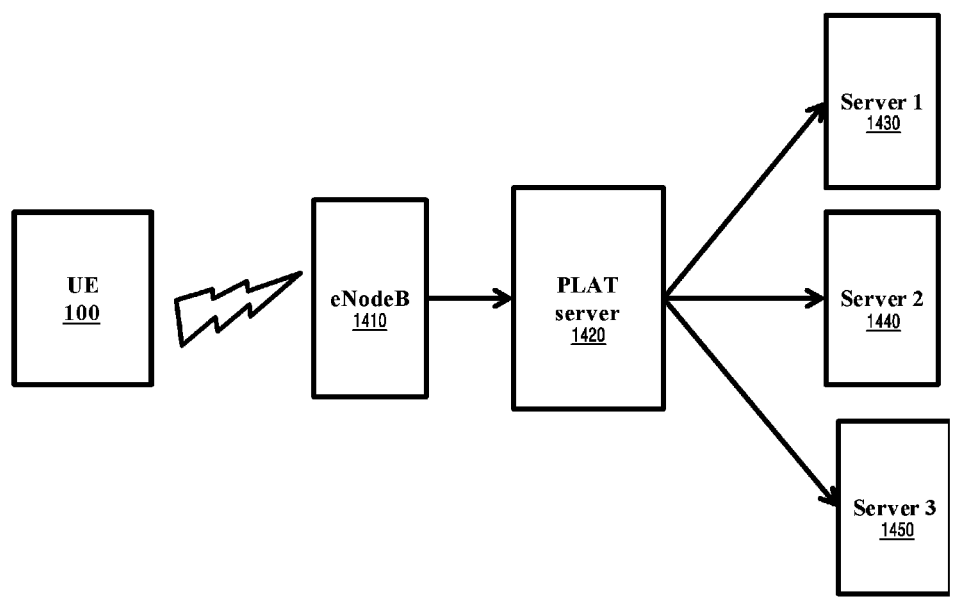
FIG. 14 illustrates a live air experimental setup for evaluation of the CAA based scheduling, according to embodiments as disclosed herein.

FIG. 14 illustrates a live air experimental setup for evaluation of the proposed method, according to embodiments as disclosed herein.

Referring to the FIG. 14, the experimental setup is used for evaluation followed by an in-depth analysis based on the experimental results carried out in the varying network and operational conditions. The experimental setup includes the UE 100 attached to 4G+ (LTE Advanced) Mobile network.

Figure 15A:
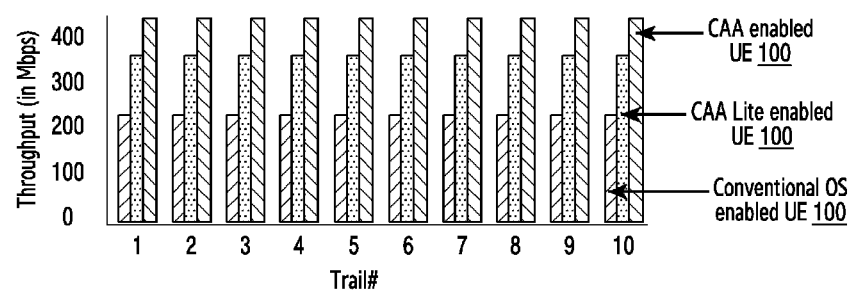
FIG. 15A illustrates a comparison of a performance of the conventional OS enabled UE 100, the CAA-LITE enabled UE 100 and the CAA enabled UE 100 using an Internet Performance Working Group (IPERF) test, according to embodiments as disclosed herein.

FIG. 15A illustrates a comparison of the performance of the conventional OS enabled UE 100, the CAA-LITE enabled UE 100 and the CAA enabled UE 100 using an Internet Performance Working Group (IPERF) test, according to embodiments as disclosed herein.

Figure 15B:
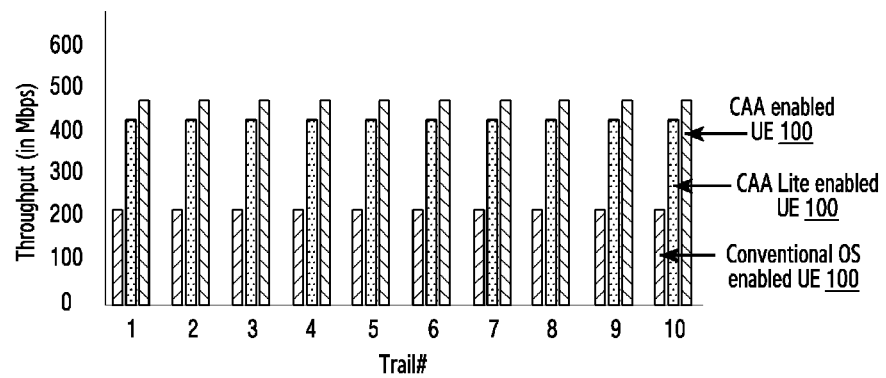
FIG. 15B illustrates a comparison of a performance of the conventional OS enabled UE 100, the CAA-LITE enabled UE 100 and the CAA enabled UE 100 using a NIA test, according to embodiments as disclosed herein.

FIG. 15B illustrates a comparison of the performance of the conventional OS enabled UE 100, the CAA-LITE enabled UE 100 and the CAA enabled UE 100 using a NIA test, according to embodiments as disclosed herein.

Referring to the FIG. 15A and the FIG. 15B in conjunction with FIG. 14, the LTE-A network of the UE 100 uses a Cat 11 3CA (Carrier aggregation) which can reach up to 600 Mbps. Each data pointed in the FIG. 15A and the FIG. 15B represents ten trails with the legacy and the proposed CAA enabled UE 100 and the CAA-LITE enabled UE 100. The results are reported as average deviation bars. The main performance measures adopted in the FIG. 15A and the FIG. 15B is the average throughput during the download.

The impact on throughput is measured using various tools such as IPERF test (as shown in FIG. 15A) and the NIA test (as shown in FIG. 15B). Further, the proposed method also captured the results using servers in the different locations (varied RTT). The various tests and server results indicate that the CAA enabled UE 100 and the CAA-LITE enabled UE 100 outperforms the conventional OS enabled UE 100 irrespective of the application and the server dependency.

Further, the FIG. 15A and the FIG. 15B, indicate that both the CAA enabled UE 100 and the CAA-LITE enabled UE 100 irrespective of the conditions, outperforms the conventional OS enabled UE 100 by a larger margin. The CAA enabled UE 100 by adapting dynamically based on the CPU load enhances the overall throughput by around 92%.

Figure 16A:
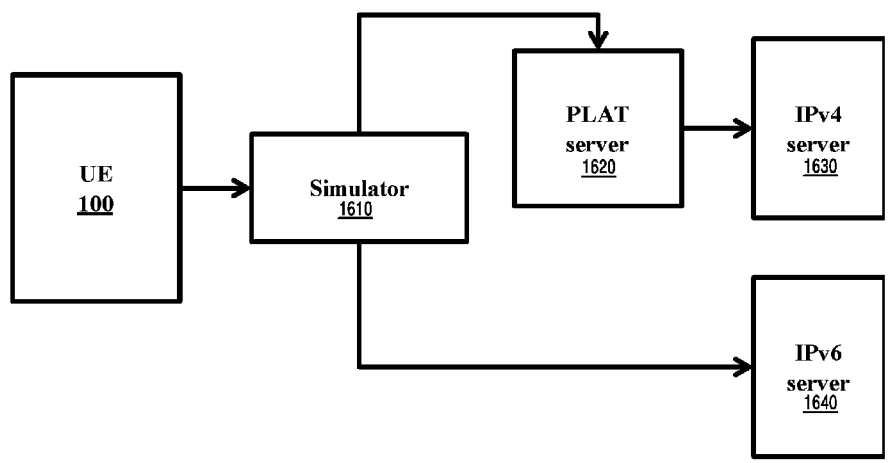
FIG. 16A illustrates a lab simulation setup for comparing a throughput of the conventional OS enabled UE 100, the CAA-LITE enabled UE 100 and the CAA enabled UE 100, according to embodiments as disclosed herein.

FIG. 16A illustrates a lab simulation setup for comparing the throughput of the conventional OS enabled UE 100, the CAA-LITE enabled UE 100 and the CAA enabled UE 100, according to embodiments as disclosed herein.

The simulation is performed as part of the transport layer. Referring to the FIG. 16A, the UE 100 is connected to a simulation equipment to simulate varied bandwidth, radio and network conditions. Further, the simulation equipment is in turn connected to the PLAT server. The IPv4 server is connected to the PLAT server and the IPv6 server is connected directly to the simulation equipment.

Figure 16B:
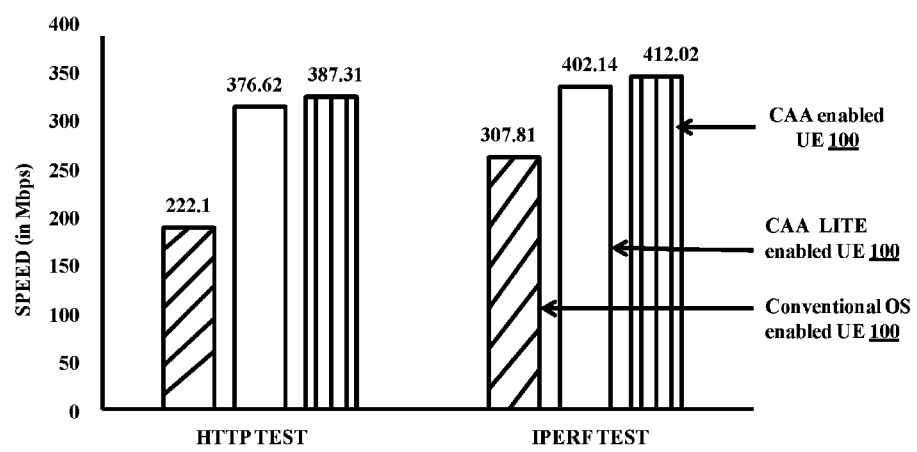
FIG. 16B is a graphical representation of a comparison of the throughput of the conventional OS enabled UE 100, the CAA-LITE enabled UE 100 and the CAA enabled UE 100, according to embodiments as disclosed herein.

FIG. 16B is a graphical representation of a comparison of the throughput of the conventional OS enabled UE 100, the CAA-LITE enabled UE 100 and the CAA enabled UE 100, according to embodiments as disclosed herein.

Considering that, in an idle condition, the mobile wireless packet loss may vary from 0.00000001% to 0.00001% and the round trip time can vary from 10 ms to 15 ms depending on the network conditions, the proposed method simulated multiple scenarios.

The server is hosted with an IPERF server in a different port and a HTTP server in a different port. Each data pointed in the FIG. 15B represents the average value from ten trails. The main performance measures adopted for the evaluation is the average throughput of the application. The test is performed in serial taking individual UE 100 at a time.

Referring to the FIG. 16B, the CAA consistently improved the throughput by 80% in the HTTP setup and up-to 90% in the IPERF setup. The difference between the HTTP and the IPERF is that in the IPERF, there are no file I/O operations involved.

Figure 17A:
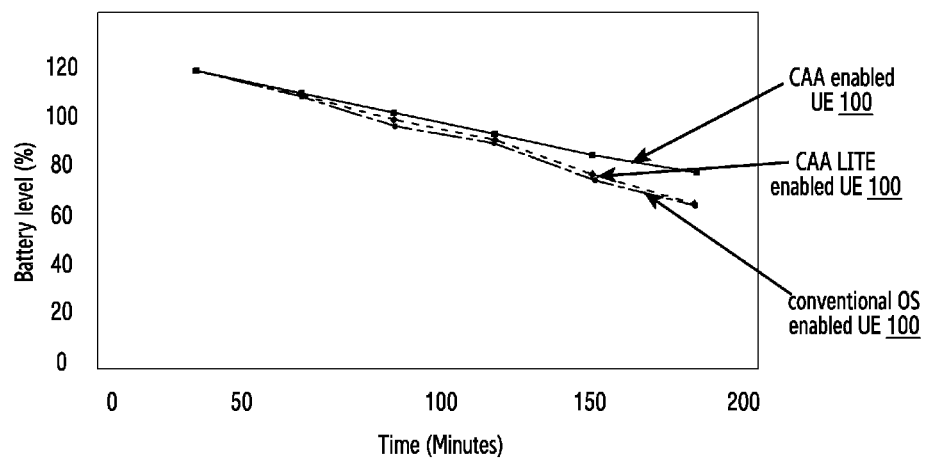
FIG. 17A is a graphical representation of a comparison of the power consumption with respect to the conventional OS enabled UE 100, the CAA-LITE enabled UE 100 and the CAA enabled UE 100, according to embodiments as disclosed herein.

FIG. 17A is a graphical representation of a comparison of the power consumption with respect to the conventional OS enabled UE 100, the CAA-LITE enabled UE 100 and the CAA enabled UE 100, according to embodiments as disclosed herein.

Figure 17B:
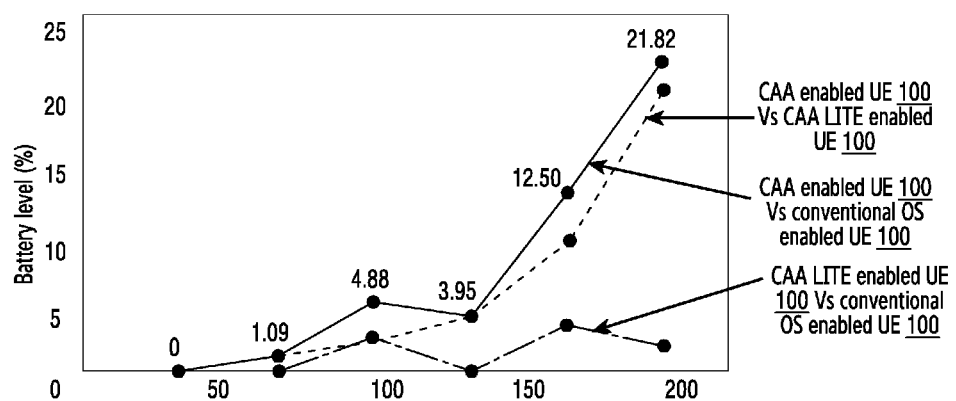
FIG. 17B is a graphical representation of a comparison of the power saving with respect to the conventional OS enabled UE 100, the CAA-LITE enabled UE 100 and the CAA enabled UE 100, according to embodiments as disclosed herein.

FIG. 17B is a graphical representation of a comparison of the power saving with respect to the conventional OS enabled UE 100, the CAA-LITE enabled UE 100 and the CAA enabled UE 100, according to embodiments as disclosed herein.

A power test is performed on three identical UE 100 which run on the CAA, the CAA-LITE and the conventional OS respectively. The UE 100 downloads the files from the multiple servers in a predetermined order. Initially, the three identical UE 100 are fully charged (100%) and the battery consumption is plotted against the time duration, as shown in FIG. 17A.

Referring to the FIG. 17A, the CAA enabled UE 100 is power-efficient when compared to the CAA-LITE enabled UE 100 and the conventional OS enabled UE 100. The percentage of power saved in the three identical UEs 100 is shown in FIG. 17B. Based on the FIG. 17A and the FIG. 17B, the CAA-LITE enabled UE 100 achieves better throughput. However, due to assignment of the affinity statically the power consumption gets affected. In case of the CAA enabled UE 100, the packets are scheduled efficiently by fetching the multiple levels of information and thereby resulting in the saving of the power up to 22%.

Further, the effects of the DUAL IP architecture on the bandwidth utilization of the UE 100 are also tested, with emphasis on multi-core scheduling algorithm. The CAA scheduler 180 schedules the networking packets among the plurality of the cores of the multi-core 120 system to achieve improved throughput in the dual stack UE 100. Also, the proposed CAA LITE enabled UE 100 provides a static affinity scheduling with minimal steps.

Based on the results of the various tests performed, the CAA enabled UE 100 outperformed the conventional OS enabled UE 100 by providing an improved throughput of around 90% under various operational conditions. Hence, the proposed scheduling method provides increased throughput along with reduced power consumption.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

The invention claimed is:

1. A method performed by a user equipment (UE) in a wireless communication system, the method comprising:
receiving, by a connection and customer side translator (CLAT) aware affinity (CAA) scheduler at the UE, a packet for establishing a CAA-based scheduling;
determining, by the CAA scheduler, a path characteristic of the packet;
determining, by the CAA scheduler, at least one of an IPv4 connection and an IPv6 connection based on the path characteristic of the packet;
establishing, by the CAA scheduler, a connection to at least one of an IPv4 server and an IPv6 server based on the determined at least one of the IPv4 connection and the IPv6 connection;
determining whether an IP header of the packet comprises one of an IPv4 prefix IP address and an IPV6 prefix IP address;
classifying the packet into one category of:
a Class A category in response to determining that the IP header of the packet comprises IPV4 prefix IP address,
a Class B category in response to determining that the IP header of the packet comprises IPV6 prefix IP address, and
a Class C category in response to determining that the IP header of the packet neither comprises IPv4 prefix IP address nor IPV6 prefix IP address; and
scheduling, by the CAA scheduler, the packet on at least one core of at least one processor included in the UE, based on the one of the Class A category, the Class B category, and the Class C category.

2. The method of claim 1, wherein the establishing, by the CAA scheduler, of the connection to the at least one of the IPv4 server and the IPv6 server comprises:
performing, by the CAA scheduler, one of:
connecting to the IPv4 server in response to determining that the IPv6 server is not available,
connecting to the IPv6 server only in response to determining that a performance of the IPv6 server and a performance of the IPv4 server are equal, or
connecting to the IPv4 server in response to determining that the performance of the IPv4 server is better than the performance of the IPv6 server.

3. The method of claim 1, wherein the Class A category indicates a forwarded packet or a local packet between the CLAT and applications having a IPv4 header.

4. The method of claim 1, wherein the Class B category indicates actual or live air packets between RMNET and PLAT with a synthesized IPv6 header.

5. The method of claim 1, wherein the Class C category indicates packets with direct IPv6 header or local socket communication inside the UE.

6. The method of claim 1, wherein the scheduling, by the CAA scheduler, of the packet on the at least one core of the at least one processor based on the one of the Class A category, the Class B category, and the Class C category comprises:
determining whether the packet is classified into the one of the Class A category, the Class B category, and the Class C category;
creating one of:
a high priority queue and marking the packet in the high priority queue in response to determining that the packet is classified into the Class A category,
an intermediate priority queue and marking the packet in the intermediate priority queue in response to determining that the packet is classified into the Class B category, or
a low priority queue and marking the packet in the low priority queue in response to determining that the packet is classified into the Class C category; and
scheduling, by the CAA scheduler, the packet on the at least one core of the at least one processor based on the one of the high priority queue, the intermediate priority queue, and the low priority queue.

7. The method of claim 6, wherein the scheduling, by the CAA scheduler, of the packet on the at least one core of the at least one processor based on the one of the high priority queue, the intermediate priority queue, and the low priority queue comprises:

monitoring operational conditions of the at least one processor;

modifying a CPU affinity of the at least one processor based on the monitored operational conditions and the one of the high priority queue, the intermediate priority queue, and the low priority queue; and scheduling the packet on the at least one core of the at least one processor based on the modification.

8. The method of claim 7, wherein the operational conditions comprises at least one of a CPU load, a CPU Frequency, a current CPU affinity, a Receive Packet Steering (RPS), and CAA cross layer parameters.

9. The method of claim 8, wherein the CAA cross layer parameters comprises at least one of radio information of the UE, battery information of the UE, display information of the UE, Radio Interface Layer Daemon (RILD) information, and Network Daemon (NETD) information.

10. The method of claim 6, wherein the scheduling, by the CAA scheduler, of the packet on the at least one core of the at least one processor based on the one of the high priority queue, the intermediate priority queue, and the low priority queue comprises:

modifying a CPU affinity of the at least one processor based on the one of the high priority queue, the intermediate priority queue, and the low priority queue; and scheduling the packet on the at least one core of the at least one processor based on the modification.

11. A user equipment (UE) in a wireless communication system, the UE comprising:

a transceiver;

a memory;

a connection and customer side translator (CLAT) aware affinity (CAA) scheduler; and at least one processor coupled with the transceiver, the memory, and the CAA Scheduler, wherein the at least one processor is configured to:

receive at the UE a packet for establishing a CAA-based scheduling;

determine a path characteristic of the packet;

determine at least one of an IPv4 connection and an IPv6 connection based on the path characteristic of the packet;

establish a connection to at least one of an IPv4 server and an IPv6 server based on the determined at least one of the IPv4 connection and the IPv6 connection, determine whether an IP header of the packet comprises one of an IPv4 prefix IP address and an IPV6 prefix IP address;

classify the packet into one category of:

a Class A category in response to determining that the IP header of the packet comprises IPV4 prefix IP address, a Class B category in response to determining that the IP header of the packet comprises IPV6 prefix IP address, and a Class C category in response to determining that the IP header of the packet neither comprises IPv4 prefix IP address nor IPV6 prefix IP address; and schedule, by the CAA scheduler, the packet on at least one core of the at least one processor based on the one of the Class A category, the Class B category, and the Class C category.

12. The UE of claim 11, wherein the at least one processor that is configured to establish the connection to at least one of the IPv4 server and the IPv6 server is further configured to:

connect to the IPv4 server in response to determining that an IPv6 server is not available, connect to the IPv6 server only in response to determining that a performance of the IPv6 server and a performance of the IPv4 server are equal, or connect to the IPv4 server in response to determining that the performance of the IPv4 server is better than the performance of the IPv6 server.

* * * * *